United States Patent
Ando

(10) Patent No.: US 7,142,973 B2
(45) Date of Patent: Nov. 28, 2006

(54) ENGINE CONTROL APPARATUS DESIGNED TO ENSURE ACCURACY IN DETERMINING ENGINE POSITION

(75) Inventor: Katsuyuki Ando, Kasugai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/149,550

(22) Filed: Jun. 10, 2005

(65) Prior Publication Data
US 2005/0278109 A1 Dec. 15, 2005

(30) Foreign Application Priority Data

| Jun. 11, 2004 | (JP) | ............... 2004-174299 |
| Jun. 11, 2004 | (JP) | ............... 2004-174300 |
| Jun. 11, 2004 | (JP) | ............... 2004-174301 |
| Jun. 11, 2004 | (JP) | ............... 2004-174302 |

(51) Int. Cl.
*G06G 7/70* (2006.01)
*G06F 19/00* (2006.01)
*F02N 17/00* (2006.01)
*G01M 15/00* (2006.01)

(52) U.S. Cl. ............... 701/112; 701/113; 123/179.4

(58) Field of Classification Search ........ 701/101–103, 701/110–115; 123/179.3, 179.4, 491; 73/116, 73/117.3
See application file for complete search history.

(56) References Cited

U.S. PATENT DOCUMENTS

| 5,595,161 | A | | 1/1997 | Ott et al. | |
| 6,341,253 | B1 | | 1/2002 | Honda | |
| 6,499,342 | B1 | * | 12/2002 | Gonzales, Jr. | ............. 73/117.3 |
| 6,679,223 | B1 | | 1/2004 | Sakakibara | |
| 6,718,929 | B1 | * | 4/2004 | Onozawa et al. | ......... 123/182.1 |
| 6,722,332 | B1 | * | 4/2004 | Kojima | .................... 123/179.3 |
| 6,874,359 | B1 | | 4/2005 | Shimizu | |
| 6,947,827 | B1 | * | 9/2005 | Fuse et al. | ................... 701/110 |
| 7,011,063 | B1 | * | 3/2006 | Condemine et al. | ..... 123/179.4 |
| 7,027,911 | B1 | * | 4/2006 | Nishikawa et al. | ......... 701/112 |
| 7,059,297 | B1 | * | 6/2006 | Kataoka et al. | .......... 123/179.4 |
| 7,079,939 | B1 | * | 7/2006 | Kataoka et al. | ............. 701/112 |
| 2006/0129305 | A1 | * | 6/2006 | Nishikawa et al. | ......... 701/112 |

FOREIGN PATENT DOCUMENTS

| JP | 5-187291 | | 7/1993 | |
| JP | 8-506397 | | 7/1996 | |
| JP | 10-30489 | | 2/1998 | |
| JP | 11107823 A | * | 4/1999 | ................ 73/117.3 |
| JP | 11-159390 | | 6/1999 | |
| JP | 2000027699 A | * | 1/2000 | ................ 701/112 |
| JP | 2001-90600 | | 4/2001 | |
| JP | 2003-3901 | | 1/2003 | |
| JP | 2004-52698 | | 2/2004 | |

* cited by examiner

*Primary Examiner*—Willis R. Wolfe, Jr.
(74) *Attorney, Agent, or Firm*—Nixon & Vanderhye P.C.

(57) ABSTRACT

An engine control system is provided which is designed to estimate an angular position at which a crankshaft of an engine is expected to stop at a stop of the engine for use in determining the position of the crankshaft at a start of the engine which is to be employed in initiating given engine control tasks. When a preselected condition which indicates the possibility of performing the engine control tasks or will result in initiation of the engine control tasks based on an erroneous value of the estimate of the stop position of the crankshaft, the engine control system inhibits the engine control tasks from being initiated using the estimate of the stop postion, thereby ensuring the stability of control of the engine.

24 Claims, 17 Drawing Sheets

ENGINE CONTROL APPARATUS DESIGNED TO ENSURE ACCURACY IN DETERMINING ENGINE POSITION

CROSS REFERENCE TO RELATED DOCUMENT

The present application claims the benefit of Japanese Patent Application Nos. 2004-174299, 2004-174301, 2004-174302, and 2004-174300 all of which were filed on Jun. 11, 2004, the disclosures of which are incorporated herein by reference.

BACKGROUND OF THE INVENTION

1. Technical Field of the Invention

The present invention relates generally to an engine control apparatus designed to find out an actual position of a crankshaft of an engine for use in an engine control task after the engine is cranked, and more particularly to such an engine control apparatus which works to estimate an angular position of the crankshaft at a stop of the engine and use it in determining the position of the crankshaft at a subsequent start of the engine.

2. Background Art

Japanese Patent First Publication No. 2001-90600 (U.S. Pat. No. 6,341,253 B1) teaches an engine control system designed to monitor an output of a crankshaft position sensor produced in synchronization with rotation of a crankshaft of the engine and an output of a camshaft position sensor rotating at the speed of one-half (½) of that of the crankshaft to determine the angular position of the crankshaft in each cycle of the engine and then launch engine control tasks such as fuel ignition control and fuel injection control for the engine.

The crankshaft position sensor is designed to produce a train of pulses having edges which appear in a unit of a given angle of the crankshaft and also produce a non-pulse portion in which, for example, two edges do not appear, when the crankshaft reaches a given reference position. The camshaft position sensor is designed to change between a high and a low level in synchronization with rotation of the camshaft and have the levels different between two adjacent appearances of the non-pulse portion of the output of the crankshaft position sensor. The camshaft position sensor is made of a magnetic resistance element (MRE).

The engine control system works to determine whether the non-pulse portion has appeared at the output of the crankshaft position sensor or not. When such appearance is detected, the engine control system monitors an instantaneous level of the output of the camshaft position sensor to determine the position of the crankshaft. For instance, when the output of the camshaft position sensor is in the high level, the crankshaft is determined to be in a predetermined position X° CA (crank angle). Alternatively, when it is in the low level, the crankshaft is determined to be in a position 360° CA after the position X° CA. The engine control system works to measure an edge-to-edge interval of the output of the crankshaft position sensor and determines that the non-pulse portion has appeared when a ratio of a current value of the edge-to-edge interval to a previous one is greater than a predetermined value.

Japanese Patent First Publication No. 5-187291 discloses a crankshaft position sensor-less system designed to find the position of the crankshaft and the speed of the engine only using the output of the camshaft position sensor. This type of system, however, consumes the time equivalent to a few turns of the crankshaft between the beginning of engine cranking and the time when the non-pulse portion of the crankshaft position sensor is detected to determine the position of the crankshaft. This results in a delay in launching fuel ignition and fuel injection control tasks for the engine or causes the fuel leaking out of fuel injectors or unburned air-fuel mixture staying within an intake pipe of the engine to be discharged as it is as harmful emissions before start-up of the engine. In order to meet emission regulations tightened in recent years, it is essential to burn out the fuel substantially simultaneously with start-up of the engine by the engine starter to avoid the discharge of the air-fuel mixture to the exhaust pipe as it is.

In order to improve the startability of and the exhaust emissions from the engine, U.S. Pat. No. 5,595,161 teaches an engine control system designed to evaluate outputs of the crankshaft position sensor and the camshaft position sensor at the stop of the engine to estimate the position at which the engine (i.e., the crankshaft) is expected to stop and initiate the engine control task based on the estimate of the stop position of the crankshaft.

Engine control systems of the above type equipped with an stop position estimating function achieves the estimation of the stop position of the crankshaft in accordance with given algorithmic logic. This may, however, result in an error of such estimation depending upon operating conditions of the engine or environmental conditions.

For instance, the lack of warm-up of the engine will result in an increase in viscosity of engine oil, so that the engine has an increased resistance to rotation thereof. This results in an increased possibility that the crankshaft would be reversed in rotation adjust before stopping without exceeding the Top Dead Center (TDC) of one of cylinders of the engine. Such an event may result in a difficulty in estimating the stop position of the crankshaft. The increased resistance to rotation of the engine may cause the waveform, the edge-to-edge interval, or the times of appearance of the edges of the outputs from the crankshaft position sensor and the camshaft position sensor used to estimate the stop position of the crankshaft to be changed from expected ones, thus resulting in an error in estimating the stop position of the crankshaft.

Further, a failure in operation of the crankshaft position sensor or the camshaft position sensor or a disconnection between either of the sensors and the engine control system will also result in an error in estimating the stop position of the crankshaft. Additionally, an undesirable drop in voltage of a storage battery installed in an automotive vehicle arising from aging thereof may also result in undesirable changes in characteristics of the crankshaft position sensor and the camshaft position sensor or a wave-shaping circuit used to shape the waveform of the outputs from the sensors, which will lead to an error in estimating the stop position of the crankshaft.

When it is required to start the engine, initiation of engine control tasks such as the fuel ignition and fuel injection using an erroneous estimate of the stop position of the crankshaft will result in failure in starting the engine or deterioration of exhaust emissions of the engine.

SUMMARY OF THE INVENTION

It is therefore a principal object of the invention to avoid the disadvantages of the prior art.

It is another object of the invention to provide an engine control apparatus designed to ensure the stability of operation control of an engine;

It is a further object of the invention to provide an engine control apparatus designed to minimize errors in estimating the position of an engine or a crankshaft of the engine arising from various factors.

According to one aspect of the invention, there is provided an engine control apparatus which may be employed in determining the position of an automotive internal combustion engine or a crankshaft thereof at a start of the engine for use in launching given engine control tasks. The engine control apparatus comprises: (a) a crankshaft position determining circuit working to determine a crankshaft position that is a position of a crankshaft of an engine within one operating cycle of the engine in one of a first and a second mode of operation, in the first mode, the crankshaft position being determined using both a crank angle signal outputted from a crankshaft position sensor as a function of an angular position of the crankshaft and a cam angle signal outputted from a camshaft position sensor as a function of an angular position of a camshaft of the engine, in the second mode, the crankshaft position being determined only using the crank angle signal; (b) a stop position estimating circuit working to determine a stop position estimate that is an estimate of a position at which the crankshaft is expected to stop when the engine stops using at least one of the crank angle signal and the cam angle signal; and (c) an engine controller working to launch a given engine control task at a start of the engine based on the stop position estimate of the crankshaft, as determined by the stop position estimating circuit. When one of a first condition that indicates a possibility of performing the engine control task based on an erroneous value of the stop position estimate and a second condition that results in initiation of the engine control task based on an erroneous value of the stop position estimate is encountered, the engine controller inhibits the engine control task from being launched based on the stop position estimate. This eliminates an error in performing the engine control task to alleviate the problems, as discussed above.

In the preferred mode of the invention, the engine controller works to determine whether a third condition is met or not which indicates a possibility of an error in determining the stop position estimate through the stop position estimating circuit at a stop of the engine. When the third condition is met, the engine controller determines that the first condition is encountered to inhibit the engine control task from being launched. When the stop position estimate is not determined by the stop position estimating circuit, the engine controller initiates the engine control task following a determination of the crankshaft position made by the crankshaft position determining circuit.

For example, the third condition is a condition which causes the engine to undergo a given degree of resistance to rotation thereof.

When the temperature of a cooling water of the engine is lower than a preselected value, the engine controller may alternatively determine that the engine is undergoing the resistance to rotation thereof and that the third condition is met.

In the case where the engine is installed in an automotive vehicle, the third condition may be a condition in which a voltage developed by a storage battery installed in the vehicle is lower than a preselected level.

The third condition may alternatively be a condition which results in an error of input of at least one of the crank angle signal and the cam angle signal into the crankshaft position determining circuit.

The camshaft position sensor may be designed to produce the cam angle signal which switches between a high and a low level in synchronization with rotation of the camshaft. The engine control apparatus may also include a decision circuit working to make a decision of whether a change in level of the cam angle signal developed at a start of the engine is one which bears a given relation to the stop position estimate determined by the stop position estimating circuit or not. When the decision is positive, the crankshaft position determining circuit determines the position of the crankshaft at a start of the engine based on the stop position estimate. The engine controller performs the engine control task using the determined position of the crankshaft. When the decision is negative, the engine controller initiates the engine control task without use of the stop position estimate after the crankshaft position is determined by the crankshaft position determining circuit.

The camshaft position sensor may be designed to produce the cam angle signal which changes in level a given number of times during a complete turn of the crankshaft.

The crankshaft position determining circuit may be designed to determine the crankshaft position using both the crank angle signal and the cam angle signal.

The crank angle signal may be made of a combination of a train of pulses and a non-pulse portion. The combination is produced every turn of the crankshaft. The pulses have edges appearing in a unit of a preselected angle of rotation of the crankshaft. The non-pulse portion appears when the crankshaft reaches a given reference position every turn of the crankshaft. The cam angle signal has levels different between appearance of the non-pulse portion and following appearance of the non-pulse portion. The crankshaft position determining circuit works to monitor edge-to-edge intervals that are intervals each of which is developed between adjacent two of the pulses to find appearance of the non-pulse portion at the cam angle signal. When the appearance of the non-pulse portion is found, the crankshaft position determining circuit determines the crankshaft position based on the level of the cam angle signal upon the appearance of the non-pulse portion.

The crank angle signal may be made of a train of pulses which have edges appearing in a unit of a preselected angle of rotation of the crankshaft. The camshaft position sensor may be designed to produce the cam angle signal which has changes in level in a given pattern in a cycle in which the camshaft makes a complete turn so that intervals between adjacent two of the changes in level are different from each other in terms of an angle of rotation of the crankshaft. The crankshaft position determining circuit works to determine the crankshaft position as a function of number of the edges of the pulses of the crank angle signal appearing within one of the intervals of the changes in level of the cam angle signal.

The engine control apparatus may also include a condition monitor circuit working to monitor whether a condition is encountered or not which causes the engine to undergo a given degree of resistance to rotation thereof. When the condition is determined to be encountered, the condition monitor circuit inhibits the decision circuit from making the decision. When the condition monitor circuit inhibits the decision circuit from making the decision, the engine controller initiates the engine control task after the crankshaft position is determined by the crankshaft position determining circuit.

In the case where the engine is installed in an automotive vehicle, the engine control apparatus may also include a voltage monitor circuit which works to monitor whether a voltage developed by a storage battery installed in the vehicle is lower than a preselected level or not at a start of the engine. When the voltage is determined as be lower than the preselected level, the voltage monitor circuit inhibits the decision circuit from making the decision. When the voltage monitor circuit inhibits the decision circuit from making the decision, the engine controller initiates the engine control task after the crankshaft position is determined by the crankshaft position determining circuit.

The engine control apparatus may also include an error monitor circuit which works to monitor whether an error of input of the cam angle signal into the engine control apparatus has arisen or not at a start of the engine. When the error is detected, the error monitor circuit inhibits the decision circuit from making the decision. When the error monitor circuit inhibits the decision circuit from making the decision, the engine controller initiates the engine control task after the crankshaft position is determined by the crankshaft position determining circuit.

The crankshaft position sensor may be designed so that a predetermined level change appears when the crankshaft reaches a given reference position. The crankshaft position determining circuit may include a first position determining circuit and a second position determining circuit. The first position determining circuit works to determine the position of the crankshaft using the stop position estimate and the cam angle signal at a start of the engine. The engine control apparatus may also include a position updating circuit and a first failure detecting circuit. The position updating circuit works to update the position of the crankshaft based on the crank angle signal in synchronization of rotation of the engine once the first position determining circuit determines the position of the crankshaft. The first failure detecting circuit works to detect a failure in operation of the crankshaft position sensor. When the position of the crankshaft is determined by the first position determining circuit at the start of the engine, the engine controller initiates the engine control task using the determined position of the crankshaft and then continues to execute the engine control task using the position of the crankshaft updated by the position updating circuit. The second position determining circuit works to detect a fact that the crankshaft has reached the reference position using the crank angle signal to determine the position of the crankshaft at least when the first failure detecting circuit has detected the failure in operation of the crankshaft position sensor. When the camshaft position sensor has failed in operation, thereby resulting in a difficulty in determining the position of the crankshaft through the first position determining circuit, the engine controller initiates the engine control task using the position of the crankshaft as determined by the second position determining circuit.

When detecting the fact that the crankshaft has reached the reference position using the crank angle signal, the second position determining circuit may analyze an instantaneous change in level of the crank angle signal to find the position of the crankshaft.

The crankshaft position sensor may include an intake camshaft position sensor designed to measure an angular position of an intake camshaft of the engine to output an intake cam angle signal indicative thereof and an exhaust camshaft position sensor designed to measure an angular position of an exhaust camshaft of the engine to output an exhaust cam angle signal indicative thereof. The first failure detecting circuit works to detect failures in operations of the intake and exhaust camshaft position sensors, respectively. The first position determining circuit determines the position of the crankshaft based on the stop position estimate and the intake and exhaust cam angle signals. When the second position determining circuit detects the fact that the crankshaft has reached the reference position based on the crank angle signal, and the first failure detecting circuit has detected the failure in operation of one of the intake and exhaust camshaft position sensors, the second position determining circuit determines the position of the crankshaft based on one of the intake and exhaust cam angle signals outputted from the other of the intake and exhaust camshaft position sensors.

The engine control apparatus may also include a second failure detecting circuit working to detect a failure in operation of the crankshaft position sensor and a third position determining circuit working to determine the position of the crankshaft in a cycle based on a change in level of the cam angle signal. When the second failure detecting circuit has detected the failure in operation of the crankshaft position sensor which results in a difficulty in updating the position of the crankshaft through the position updating circuit, the engine controller performs the engine control task using the position of the crankshaft determined cyclically by the third position determining circuit.

The crankshaft position determining circuit may include a first position determining circuit and a second position determining circuit. The first position determining circuit works to determine the position of the crankshaft using the stop position estimate and the cam angle signal at a start of the engine. When the position of the crankshaft is determined by the first position determining circuit, the engine controller commences the engine control task based on the determined position and then updates the determined position based on the crank angle signal in synchronization of rotation of the engine. The second position determining circuit is designed to determine the position of the crankshaft in the operating cycle of the engine based on at least one of the crank angle signal and the cam angle signal. When the second position determining circuit has determined the position of the crankshaft before the first position determining the position of the crankshaft at the start of the engine, the engine controller initiates the engine control task based on the position of the crankshaft, as determined by the second position determining circuit.

The crankshaft position sensor may be designed so that a predetermined level change appears when the crankshaft reaches a given reference position. The second position determining circuit works to detect a fact that the crankshaft has reached the reference position using the crank angle signal to determine the position of the crankshaft. When detecting the fact, the second position determining circuit determines the position of the crankshaft based on one of an instantaneous value of the crank angel signal and a change in level of the cam angle signal.

The engine control apparatus may also include a third position determining circuit working to determine the position of the crankshaft in a cycle based on a change in level of the cam angle signal. When the position of the crankshaft has been determined first among the first position determining circuit, the second position determining circuit, and the third position determining circuit, the engine controller launches the engine control task using the first determined position.

The stop position estimating circuit may work to monitor a change in level of one of the cam angle signal and the crank angle signal to determine whether the engine is running in a forward direction or a reverse direction. When the direction of rotation of the engine is found, the stop position estimating circuit determines the stop position estimate using the found direction. When a difficulty is encountered in finding the direction of rotation of the engine, the stop position estimating circuit determines stop position estimates of the crankshaft when the engine is viewed as running in the forward direction and when the engine is viewed as running in the reverse direction.

The stop position estimating circuit may include a first direction determining feature working to find the direction of rotation of the engine using the change in level of the cam angle signal and a second direction determining feature working to find the direction of rotation of the engine using the change in level of the crank angle signal. When the direction of rotation of the engine is found by either of the first or second direction determining feature, the stop position estimating circuit determines the stop position estimate of the crankshaft based on the found direction. When a difficulty in finding the direction of rotation of the engine is encountered by both the first and second direction determining features, the stop position estimating circuit determines the stop position estimates of the crankshaft when the engine is viewed as running in the forward direction and when the engine is viewed as running in the reverse direction.

When a plurality of the stop position estimates are produced by the stop position estimating circuit, the stop position estimating circuit works to determine whether the stop position estimates match reference values or not which are predetermined as being unsuitable for use in determining the position of the crankshaft in the first position determining circuit. The engine control apparatus may also include a stop position estimation inhibit circuit working to inhibit the stop position estimating circuit from estimating the position of the crankshaft expected to stop at the stop of the engine when the stop position estimates are determined as matching the reference values to inhibit the first position determining circuit from determining the position of the crankshaft at a subsequent start of the engine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
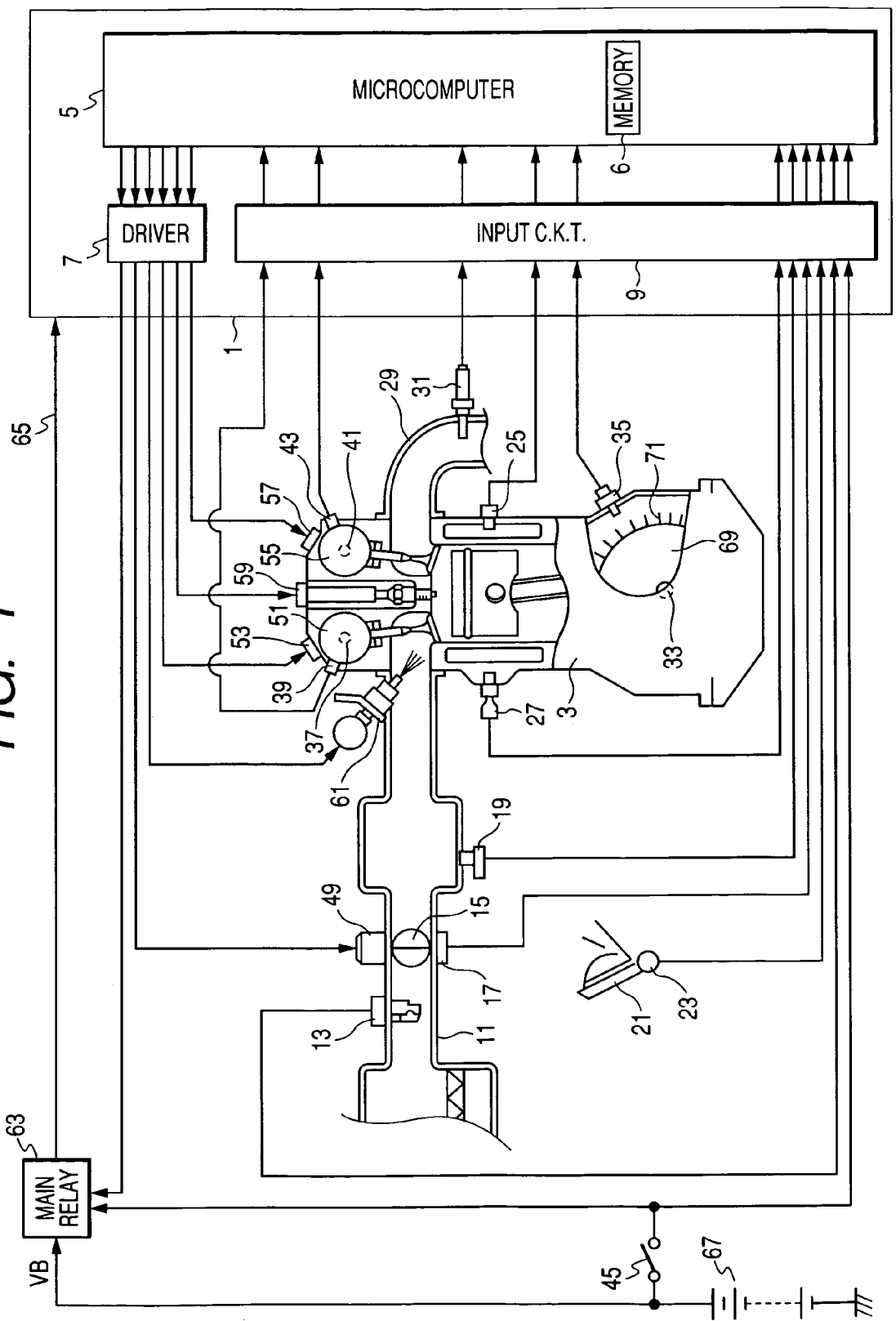
FIG. 1 is a circuit diagram which shows an engine control system according to the invention.

Referring to the drawings, wherein like reference numbers refer to like parts in several views, particularly to FIG. 1, there is shown an engine control system 1 according to the first embodiment of the invention which is designed to control an operation of a DOHC inline five-cylinder four-stroke one-cycle engine 3 (also called four-cycle engine) mounted in an automotive vehicle.

The engine control system 1 is implemented by an electronic control unit (ECU) and consists essentially of a microcomputer 5 working to control an operation of the engine 3, a driver circuit 7 working to control operations of actuators, as will be described later, and an input circuit 9 through which various types of signals, as will be described below, are inputted to the microcomputer 5.

An intake air flow rate sensor 13 is installed in an intake pipe 11 of the engine 3 to measure the flow rate of intake air flowing through the intake pipe 11. A throttle position sensor 17 is installed in the intake pipe 11 to measure the position of a throttle valve 15. An intake air pressure sensor 19 is installed in the intake pipe 11 to measure the pressure of the intake air. A pedal position sensor 23 is installed on an accelerator pedal to measure the stroke or position of an accelerator pedal 21 depressed by a driver of the vehicle. A coolant temperature sensor (also called a water temperature sensor) 25 is installed in the engine 3 to measure the temperature of cooling water for the engine 3. A knock sensor 27 is installed in the engine 3 to detect knocking of the engine 3. An oxygen concentration sensor (also called an $O_2$ sensor) 31 is installed in an exhaust pipe 29 of the engine 3 to measure the concentration of oxygen ($O_2$) contained in exhaust emissions of the engine 3. A crankshaft position sensor 35 is installed in the engine 3 to measure the angular position of a crankshaft 33. An intake camshaft position sensor 39 is installed in the engine 3 to measure the angular position of an intake camshaft 37 working to move intake valves of the engine 3. An exhaust camshaft position sensor 43 is installed in the engine 3 to measure the angular position of an exhaust camshaft 41 working to move exhaust valves of the engine 3. An ignition switch 45 is connected to a storage battery 67 and works to produce an ON-signal upon turning on thereof. Outputs of these sensors are all inputted to the microcomputer 5 through the input circuit 9. Outputs of other sensors such as an engine starter switch, etc. are also inputted to the microcomputer 5 through the input circuit 9.

The microcomputer 9 works to analyze the inputs signals, as described above, to determine operating conditions of the engine 3 and the vehicle and outputs control signals to the drive circuit 7 to control operations of a throttle motor 49, an intake-side oil control valve 53, an exhaust-side oil control valve 57, ignition coils 59, and fuel injectors 61. The throttle motor 49 works to move the throttle valve 15 to change the degree to which the throttle valve 15 is opened. The intake-side oil control valve 53 works to hydraulically actuate an intake variable valve timing mechanism 51 to change a phase difference between rotations of the crankshaft 33 and the intake camshaft 37 (i.e., an open/close timing of the intake valves of the engine 3) and the amount of lift of the intake valves. Similarly, the exhaust-side oil control valve 57 works to hydraulically actuate an exhaust variable valve timing mechanism 55 to change a phase difference between rotations of the crankshaft 33 and the exhaust camshaft 41 (i.e., an open/close timing of the exhaust valves of the engine 3) and the amount of lift of the exhaust valves. The ignition coils 59 work to energize spark plugs to produce a sequence of sparks in the engine 3. The fuel injectors 61 work to inject fuel into cylinders of the engine 3.

The engine control system 1 is connected to a main relay 63. The main relay 63 is turned on upon turning on of the ignition switch 45 to supply a battery voltage VB (i.e., the voltage appearing at a plus terminal of the battery 67 installed in the vehicle) to the engine control system 1 through a power supply line 65. The engine controls system 1 is turned on upon the supply of the battery voltage VB to activate the microcomputer 5, the drive circuit 7, and the input circuit 9. The microcomputer 5 is also designed to turn on or off the main relay 63 through the drive circuit 7. Specifically, when the ignition switch 45 is turned on to close the main relay 63, the microcomputer 5 is activated to keep the main relay 63 closed to continue the supply of the battery voltage VB to itself after the ignition switch 45 is turned off. After completion of given tasks, the microcomputer 5 turns off or open the main relay 63 to stop the supply of the battery voltage VB to itself. Such a power supply technique is known in, for example, Japanese Patent First Publication No. 11-259375 the disclosure of which is incorporated herein by reference.

The microcomputer 5 is also designed to monitor the battery voltage VB appearing at the power supply line 65 or another line (not shown) through an A/D converter installed therein.

The crankshaft position sensor 35 is arranged to face the circumference of a rotor 69 fitted on the crankshaft 33. The rotor 69 has teeth 71 arrayed on an outer periphery thereof at an angular interval of 6°. The crankshaft position sensor 35 is implemented by an electromagnetic pickup or a Hall IC sensor working to produce a sequence of pulses (which will also be referred to as a crank angle (CA) signal below) each of which falls upon passage of one of the teeth 71 This pulse train is shaped by the input circuit 9 to have a rectangular waveform defined by given high and low levels and then inputted into the microcomputer 5. The rotor 69 has a non-tooth portion in the array of the teeth 71 where two teeth are omitted.

Figure 2:
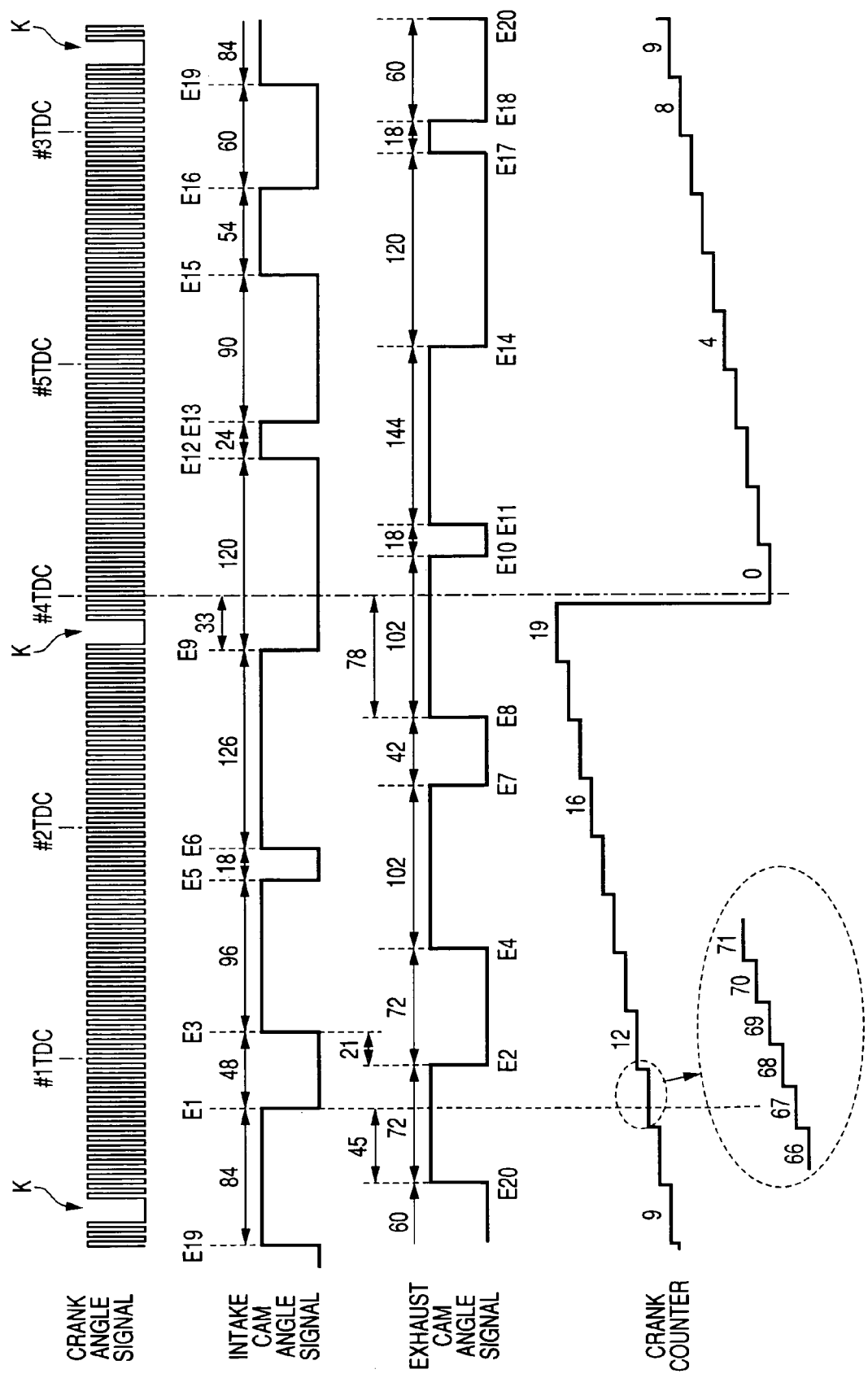
FIG. 2 is a timechart which demonstrates outputs of a crankshaft position sensor, an intake camshaft position sensor, and an exhaust camshaft position sensor and a count of a crank counter during one operating cycle of an engine.

The crank angle signal inputted to the microcomputer 5 through the input circuit 9, as clearly shown in FIG. 2, has trailing edges appearing at an interval of 6° CA (i.e., every 6° rotation of the crankshaft 33) and a non-pulse portion K appearing when the non-tooth portion of the rotor 69 passes the crankshaft position sensor 35. The non-pulse portion K is equivalent to three times the interval between adjacent two of the trailing edges of the crank angle signal (i.e., 18° CA) and appears when the crankshaft 33 reaches a reference position.

The engine 3 is, as can be seen from FIG. 2, designed so that pistons reach top dead centers (TDCs) thereof, in sequence, in the order of a first cylinder #1, a second cylinder #2, a fourth cylinder #4, a fifth cylinder #5, and a third cylinder #3. The non-pulse portion K, therefore, appears in angular ranges where the piston of the fourth cylinder #4 is between 30° BTDC (Before Top Dead Center) and 12° BTDC and where the piston of the third cylinder #3 is between 42° ATDC (After Top Dead Center) and 60° ATDC.

The intake camshaft position sensor 39 is oriented toward the circumference of a rotor (not shown) secured to the intake camshaft 37. The intake camshaft position sensor 39 is implemented by a magnetic resistance element (MRE) which works to produce a signal changing between a high and a low level upon passage of each of protrusions formed on an outer periphery of the rotor on the intake camshaft 37. The output of the intake camshaft position sensor 39 (which will also be referred to as an intake cam angle signal below) is shaped by the input circuit 9 and inputted to the microcomputer 5.

The intake cam angle signal inputted to the microcomputer 5 through the input circuit 9, as can be seen from FIG. 2, has different pulse widths within a range of one combustion cycle of the engine 3 (i.e., one rotation of the intake camshaft 39, in other words, two rotations of the crankshaft 33). For example, as viewed from one of the trailing edges immediately before the fourth cylinder #4 reaches the TDC thereof, the intake cam angle signal has the low level in a range of 120° CA, the high level in a range of 24° CA, the low level in a range of 90° CA, the high level in a range of 54° CA, the low level in a range of 60° CA, the high level in a range of 84° CA, the low level in a range of 48° CA, the high level in a range of 96° CA, the low level in a range of 18° CA, and the high level in a range of 126° CA. Each of the trailing edges of the intake cam angle signal appears at a time when each of the cylinders of the engine 3 reaches 33° BTDC thereof. At adjacent two of ends of the non-pulse portion K of the crank angle signal, the intake cam angle signal has different levels, i.e., the high and low levels. Specifically, the intake cam angle signal is in the low level at 12° BTDC of the fourth cylinder #4 and the high level at 60° ATDC of the third cylinder #3.

Similarly, the exhaust camshaft position sensor 43 is oriented toward the circumference of a rotor (not shown) secured to the exhaust camshaft 41. The exhaust camshaft position sensor 43 is implemented by a magnetic resistance element (MRE) which works to produce a signal changing between a high and a low level upon passage of each of protrusions formed on an outer periphery of the rotor on the exhaust camshaft 41. The output of the exhaust camshaft position sensor 43 (which will also be referred to as an exhaust cam angle signal below) is shaped by the input circuit 9 and inputted to the microcomputer 5.

The exhaust cam angle signal inputted to the microcomputer 5 through the input circuit 9 has a pattern, as illustrated in FIG. 2, within a range of one combustion cycle of the engine 3 (i.e., one rotation of the exhaust camshaft 41, in other words, two rotations of the crankshaft 33). For example, as viewed from one of the leading edges immediately before the fourth cylinder #4 reaches the TDC thereof, the exhaust cam angle signal has the high level in a range of 102° CA, the low level in a range of 18° CA, the high level in a range of 144° CA, the low level in a range of 120° CA, the high level in a range of 18° CA, the low level in a range of 60° CA, the high level in a range of 72° CA, the low level in a range of 72° CA, the high level in a range of 102° CA, and the low level in a range of 42° CA. One of the leading edges of the exhaust cam angle signal immediately before the fourth cylinder #4 reaches the TDC thereof (i.e., the transition from the low level in the range of 42° CA to the high level in the range of 102° CA) appears at a time when the fourth cylinder #4 reaches 78° BTDC.

Figure 9:
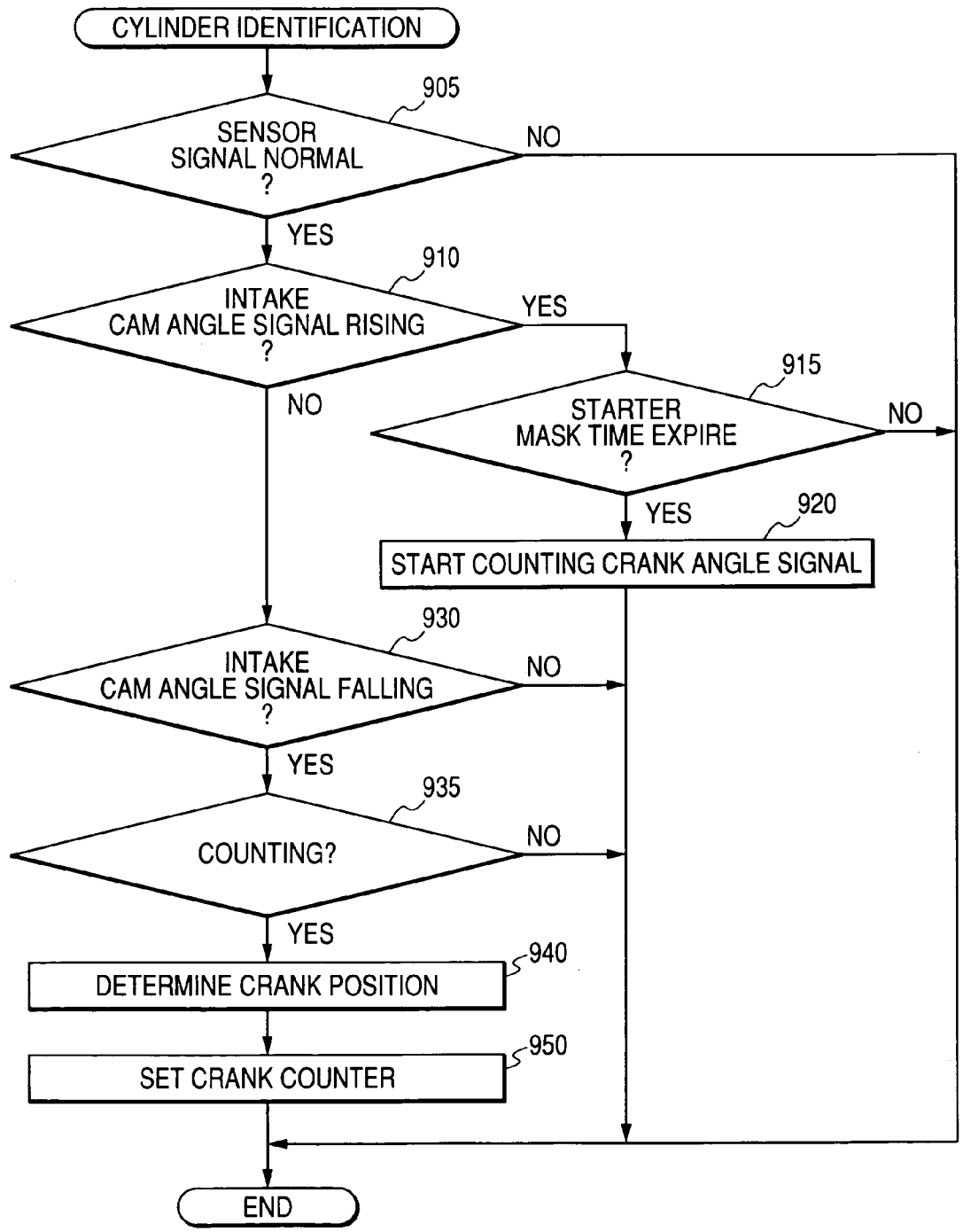
FIG. 9 is a flowchart of a subprogram to be executed in the program of FIG. 7 to identify cylinders of an engine.

In FIG. 2, numerals, as labeled on arrows of each of the intake and exhaust cam angle signals, indicate angles of rotation of the crankshaft 33 (which will also be referred to as crank angles below) within corresponding ranges. In FIG. 9, the input circuit 9 is illustrated as a single unit, but in practice, made up of discrete circuitries each of which works to process one of the inputs to the microcomputer 5. For instance, upon input of the crank angle signal, the intake cam angle signal, the exhaust cam angle signal, or the switch signal, the input circuit 9 works to shape the waveforn thereof and output it to the microcomputer 5. Upon input of an analog signal such as that from the intake air flow rate sensor 13 or the coolant temperature sensor 25, the input circuit 9 works to remove high-frequency noises therefrom and output it to an input port of an A/D converter of the microcomputer 5. The driver circuit 7 is also made up of a plurality of drivers one for each of the actuators, as described above.

The microcomputer 5 works to analyze the crank angle signal, the intake cam angle signal, and the exhaust cam angle signal to determine the angular position of the crankshaft 33 within a range of 0° to 720° equivalent to one cycle of the engine 3 and also updates a count value of a crank counter, as illustrated in FIG. 2, which is sampled in the microcomputer 5 to specify the position of the crankshaft 33. The count value is illustrated by a solid line in FIG. 2 as having a resolution of 36° CA and lapping around 0 to 19, but in practice, has a resolution of 6°, as represented by a broken line circle. Specifically, the count value of the crank counter has a resolution of 6° and laps around 0 to 119. The angular position of the crankshaft 33 when the count value of the crank counter returns from 110 back to 0 is at 6° BTDC of the fourth cylinder #4. The microcomputer 5 samples the count value from the crank counter and sets ignition and fuel injection timings for the engine 3.

Figure 3:
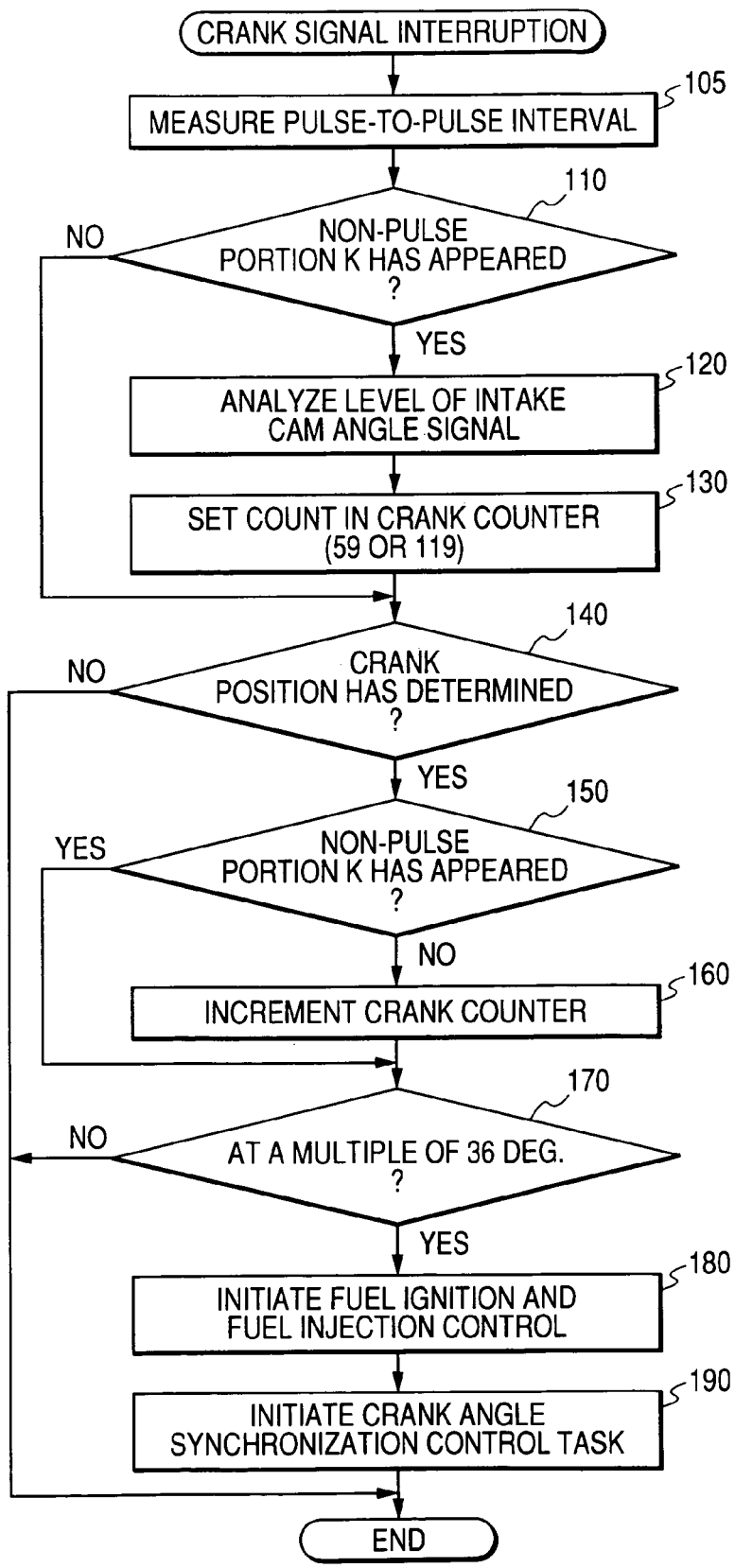
FIG. 3 is a flowchart of a program to be executed by the engine control system of FIG. 1 every input of a signal outputted from a crankshaft position sensor for initiating engine control tasks.
Figure 4:
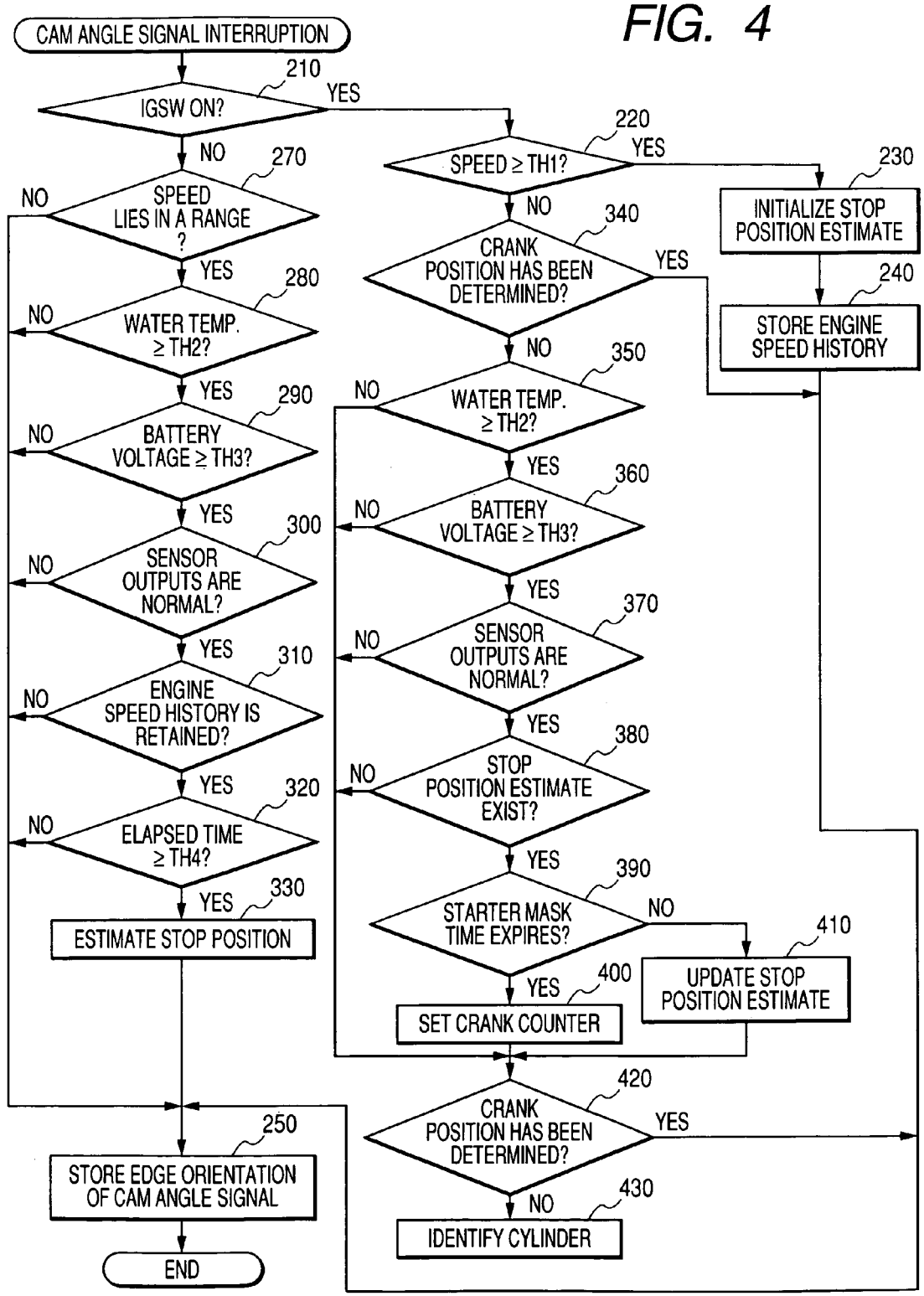
FIG. 4 is a flowchart of a program to be executed by the engine control system of FIG. 1 every input of a signal outputted form one of an intake and an exhaust camshaft position sensor to estimate the position at which a crankshaft of an engine is expected to stop at a stop of the engine and determine the position of the crankshaft at a start of the engine.

FIGS. 3 and 4 are flowcharts of sequences of logical steps or programs to be executed by the microcomputer 5 to determine the angular position of the crankshaft 33. The microcomputer 5 has installed therein a RAM storing therein data and a rewritable nonvolatile memory such as a flash ROM or an EEPRON working to keep data even when the battery voltage VB is not supplied to the power supply line 65. Although not specified in the following discussion, parameters are stored in the RAM and cleared or altered to predetermined initial values at initialization performed when the microcomputer 5 starts upon turning on of the ignition switch 45.

The program of FIG. 3 is initiated by interruption each time the trailing edge of the crank angle signal is inputted to the microcomputer 5, but held from being executed during a starter mask time until a given period of time expires since the engine is cranked by the starter upon turning on of the starter switch because great noises arising from the operation of the starter would be added to the crank angle signal.

After entering the program, the routine proceeds to step 105 wherein a time interval between initiations of the program one cycle earlier and in this cycle is calculated and stored as a pulse interval of the crank angle signal. Note that when the program is commenced for the first time after the start of the microcomputer 5 following turning on of the ignition switch 45, a given maximum interval is stored as an initial value of the pulse interval.

The routine proceeds to step 110 wherein the pulse interval T1 stored in step 105 one program cycle earlier is compared with the pulse interval T0 stored in step 105 of this program cycle to determine whether a ratio of T1 to T0 (i.e., T1/T0) is greater than a preselected value H (e.g., 2.4) or not. This determination is made to determine whether the non-pulse portion K has appeared at the crank angle signal or not. If a YES answer is obtained meaning that the trailing edge of the crank angle signal, as derived in this program cycle, matches the end of the non-pulse portion K, then the routine proceeds to step 120. Alternatively, if a NO answer is obtained, then the routine proceeds directly to step 140. When the program is commenced for the first time after the start of the microcomputer 5 following turning on of the ignition switch 45, the pulse interval T0 is, as described above, set to the maximum interval, so that a NO answer will be obtained in step 110.

In step 120, the level of the intake cam angle signal, as outputted from the intake camshaft position sensor 39, is analyzed. The routine proceeds to step 130 wherein the value corresponding to the level of the intake cam angle signal, as analyzed in step 120, is set in the crank counter. Specifically, when the intake cam angle signal is determined to be in the low level, the microcomputer 5 concludes that the current angular position of the crankshaft 33 is at 12° BTDC of the piston of the fourth cylinder #4 and sets the count of the crank counter to 119 that is the last value before the count returns back to zero (0). Alternatively, when the intake cam angle signal is determined to be in the high level, the microcomputer 5 concludes that the current angular position of the crankshaft 33 is at 30° ATDC of the piston of the third cylinder #3 and sets the count of the crank counter to 59 that is the value smaller than 119 by 60 equivalent to 360° CA.

The routine then proceeds to step 140 wherein it is determined whether the angular position of the crankshaft 33 has been specified or not. The fact that the angular position of the crankshaft 33 has been specified means that the position of the crankshaft 33 has been found after the start of the microcomputer 5 following turning on of the ignition switch 45, and more specifically, that the value indicating the position of the crankshaft 33 has been set in the crank counter. When the value is set in the crank counter in step 130 or step 400 or 430, as will be described later in detail, after the start of the microcomputer 5, a YES answer is obtained in step 140.

If a NO answer is obtained in step 140 meaning that the angular position of the crankshaft 3 has not yet been specified, then the routine terminates. Alternatively, if a YES answer is obtained, then the routine proceeds to step 150 wherein the result of determination in step 110 in this program cycle is analyzed to determine whether the non-pulse portion K has appeared at the crank angle signal or not. If a YES answer is obtained, then the routine proceeds directly to step 170. Alternatively, if a NO answer is obtained, then the routine proceeds to step 160 wherein the count of the crank counter is incremented by one (1). When the count of the crank counter is 119, it is returned back to zero (0).

The routine proceeds to step 170 wherein the angular position of the crankshaft 33 is at a multiple of 36° CA from 6° BTDC of the fourth cylinder #4 or not, that is, whether the count of the crank counter is a multiple of 6 (i.e., 0, 6, 12, ..., 108, or 114) or not. If a NO answer is obtained, then the routine terminates. Alternatively, if a YES answer is obtained, then the routine proceeds to step 180 wherein a control task is launched to control ignition and fuel injection timings for each of the cylinders of the engine 3. Specifically, the microcomputer 5 calculates the ignition timing at which the spark plug of each of the cylinders of the engine 3 is energized, the quantity of fuel to be injected into each of the cylinders of the engine 3, and the injection timing at which the fuel is to be injected into each of the cylinders of the engine 3 and also sets a timer for initiating the ignition and fuel injection in the engine 3.

The routine proceeds to step 190 wherein a crank angle synchronization control task is executed which is to be initiated each 36° CA and then terminates. The angle synchronization control task will be described later in FIG. 11.

FIG. 4 shows the program to be executed each time the edge appears at either one of the intake and exhaust crank signals.

After entering the program, the routine proceeds to step 210 wherein it is determined whether the ignition switch 45 is in the on-state or not. If a YES answer is obtained meaning that the ignitions switch 45 is in the on-state, then the routine proceeds to step 220 wherein the speed of the engine 3 is greater than or equal to a preselected value TH1 or not. The value TH1 is the value at which the engine 3 may be viewed as having been run by the engine control system 1 and which is, for example, 500 rpm slightly lower than a set idle speed of the engine 3. The speed of the engine 3 is calculated as a function of the pulse interval as derived and stored in step 105 of FIG. 3.

If a YES answer is obtained in step 220 meaning that the speed of the engine 3 is greater than or equal to the preselected value TH1, then the routine proceeds to step 230 wherein the memory 6 is initialized to erase a stop position estimate that is an estimate of an angular position at which the crankshaft 3 is expected to stop. The routine proceeds to step 240 wherein a history record indicating the fact that the speed of the engine 3 has become greater than or equal to the value TH1 is stored and then to step 250. The stop position estimate is calculated and stored in the memory 6 in step 330, as will be described later.

In step 250, the level and orientation of the edge which has appeared at one of the intake and exhaust cam angle signals in this program cycle are stored.

If a NO answer is obtained in step 210 meaning that the ignition switch 45 is in the off-state, and a time span during which the engine 3 will stop soon has been entered, then the routine proceeds to step 270 wherein the speed of the engine 1 lies within a range of 0 rpm to the value TH1 or not. If a NO answer is obtained, then the routine proceeds directly to step 250. Alternatively, if a YES answer is obtained, then the routine proceeds to step 280 wherein it is determined whether the temperature of the cooling water of the engine 3, as determined using the output from the coolant temperature sensor 25, is greater than or equal to a preselected value TH2 (e.g., −2° C.) or not. If a YES answer is obtained, then the routine proceeds to step 290 wherein it is determined whether the battery voltage VB is greater than or equal to a preselected value TH3 (e.g., 8V) or not. If a YES answer is obtained, then the routine proceeds to step 300 wherein it is determined whether the crank angle signal, the intake cam angle signal, and the exhaust cam angle signal are all being inputted to the microcomputer 5 correctly or not. Specifically, the microcomputer 5 works to perform a monitoring function (not shown) to monitor the level of each of the crank angle signal, the intake cam angle signal, and the exhaust cam angle signal. If any one of the crank angle signal, the intake cam angle signal, and the exhaust cam angle signal has been changed in level, but the others remain unchanged for a given period of time, the microcomputer 5 stores a history record indicating the fact that the others are error signals in the RAM and the memory 6. The determination in step 300 of whether the crank angle signal, the intake cam angle signal, and the exhaust cam angle signal are all being inputted to the microcomputer 5 correctly or not is made by analyzing the history record.

If a YES answer is obtained in step 300 meaning that all the crank angle signal, the intake cam angle signal, and the exhaust cam angle signal are being inputted to the microcomputer 5 correctly, then the routine proceeds to step 310 wherein it is determined whether the speed of the engine 3 has become greater than the value TH1 during the on-state of the ignition switch 45 or not by determining whether the history record is retained in the memory in step 240 or not. If a YES answer is obtained, then the routine proceeds to step 320 wherein an engine start elapse time has reached a preselected time TH4 (e.g., 20 sec.) or not. The engine start elapsed time is a time duration for which the speed of the engine 3 is kept above the value TH1.

If a YES answer is obtained in step 320, then the routine proceeds to step 330 wherein the angular position at which the crankshaft 33 is expected to stop is estimated. This is achieved using the angular position of the crankshaft 33 immediately before stop thereof. Specifically, the microcomputer 5 finds which of twenty (20) edges to which edge numbers E1 to E20 are assigned in FIG. 2 has appeared last at either one of the intake and exhaust cam angle signals and stores one of the edge numbers E1 to E20 assigned to the found edge as a stop position estimate in the memory 6. The one of the edges having appeared last at either one of the intake and exhaust cam angle signals is found based on the last count of the crank counter. The crankshaft 3 may be reversed in rotation without the piston of any one of the cylinders of the engine 3 exceeding the TDC thereof. In such an event, the levels of the intake and exhaust cam angle signals change in patterns reverse to those when the crankshaft 3 rotates in a forward direction. The microcomputer 5 monitors the patterns of changes in level and edge-to-edge intervals of the intake and exhaust cam angle signals to determine whether the crankshaft 3 has been reversed in rotation or not. When detecting such a reversal, the microcomputer 5 corrects and stores the stop position estimate in the memory 6. In this way, when the engine 3 stops, that is, when the crankshaft 33 stops rotating, the microcomputer 5 retains in the memory 6 one of the edge numbers E1 to E20 assigned to the edge having appeared last at either one of the intake and exhaust cam angle signals, in other words, one of the edge numbers E1 to E20 immediately preceding one thereof assigned to the edge which will appear at either one of the intake and exhaust cam angle signals at the next start of the engine 3.

After step 330, the routine proceeds to step 250 and then terminates.

When detecting the fact that the crank angle signal, the intake cam angle signal, and the exhaust cam angle signal all remain unchanged in level for a given period of time, the microcomputer 5 decides that the engine 3 has stopped. When the ignition switch 45 is in the off-state, the microcomputer 5 turns off the main relay 63 and stops operating. In step 330, the microcomputer 5 may store the stop position estimate in the RAM and copy and put it in the memory 6 immediately before turning off the main relay 63.

If a NO answer is obtained in any one of steps 270, 280, 290, 300, 310, and 320, the routine proceeds directly to step 250 without determining the stop position estimate in step 330.

If a NO answer is obtained in step 220 meaning that the speed of the engine 3 is less than the value TH1, that is, that the engine 3 is in a starting phase, then the routine proceeds to step 340 wherein it is determined whether the angular position of the crankshaft 33 has been identified or not. If a YES answer is obtained, then the routine proceeds directly to step 250. Alternatively, if a NO answer is obtained, then the routine proceeds to step 350 wherein it is determined whether the temperature of the cooling water of the engine 3, as determined using the output from the coolant temperature sensor 25, is greater than or equal to the value TH2 or not. If a YES answer is obtained, then the routine proceeds to step 360 wherein it is determined whether the battery voltage VB is greater than or equal to the value TH3 or not. If a YES answer is obtained, then the routine proceeds to step 370 wherein it is determined whether the crank angle signal, the intake cam angle signal, and the exhaust cam angle signal are all being inputted to the microcomputer 5 correctly or not. If a YES answer is obtained meaning that all the crank angle signal, the intake cam angle signal, and the exhaust cam angle signal are being inputted to the microcomputer 5 correctly, then the routine proceeds to step 380 wherein it is determined whether the stop position estimate is retained in the memory 6, that is, whether an estimate of angular position at which the crankshaft 33 is expected to stop was found in step 330 at the last stop of the engine 3 or not. If a YES answer is obtained, then the routine proceeds to step 390.

In step 390, it is determined whether the starter mask time expires or not, that is, whether the starter mask time has been released or not. If a YES answer is obtained, then the routine proceeds to step 400 wherein the current position of the crankshaft 33 is determined based on the stop position estimate retained in the memory 6 (i.e., the angular position of the crankshaft 3 when the edge appeared in this program cycle at one of the intake and exhaust cam angle signals), and the value corresponding to the determined position of the crankshaft 33 is set in the crank counter. Specifically, one of the edge numbers E1 to E20 just preceding one thereof assigned to the edge which has appeared at either one of the intake and exhaust cam angle signals in this program cycle must be stored in the memory 6. The microcomputer 5, thus, determines in step 400 that the edge of the intake or exhaust cam angle signal to which one of the edge numbers E1 to E20 following that stored in the memory 6 as the stop position estimate is assigned represents the current position of the crankshaft 33 and sets a corresponding value in the crank counter. For instance, if the crankshaft 33 stopped between the edges E20 and E1 in FIG. 2, the edge E20 was stored in the memory 6 as the stop position estimate in step 330 at the last stop of the engine 3. If the starter mask time is released before the edge E1 appears at the intake cam angle signal at a subsequent start of the engine 3, a number 67 assigned to the edge E1 of the intake cam angle signal appearing following the edge E20 of the exhaust cam angle signal is entered in the crank counter in step 400. The microcomputer 5 reads the number 67 out of the crank counter and specifies the position of the crankshaft 33 at the current start of the engine 3.

After step 400, the routine proceeds to step 420. If a NO answer is obtained in step 390 meaning that the starter mask time does not yet expire, then the routine proceeds to step 410 wherein the edge number stored in the memory 6 as the stop position estimate is updated to one of the edge numbers E1 to E20 following the one stored in the memory 6. Specifically, when one of the edges E1 to E20 has appeared first after expiry of the starter mask time, a corresponding value is, as described above, set in the crank counter in step 400 as indicating the position of the crankshaft 33 upon appearance of the one of the edges E1 to E20. Therefore, when the starter mask time does not yet expire, the stop position estimate stored in the memory 6 is incremented by one (1) in step 410. The routine then proceeds to step 420.

If a NO answer is obtained in any one of steps 350, 360, 370, and 380, then the routine proceeds directly to step 420.

In step 420, it is determined whether the angular position of the crankshaft 33 has been identified or not. If a YES answer is obtained, then the routine proceeds directly to step 250. Alternatively, if a NO answer is obtained, then the routine proceeds to step 430. Therefore, when it has been concluded in step 340 that the angular position of the crankshaft 33 is not yet identified, but the operation in step 400 has been completed, it is determined in step 420 that the angular position of the crankshaft 33 has been identified. The routine then proceeds to step 250. Alternatively, if the operation in step 400 has not been completed, the routine proceeds from step 420 to step 430.

In step 430, the cylinders of the engine 3 are identified using the intake cam angle signal in the following manner.

First, the microcomputer 5 performs a counting function to count the number of trailing edges which have appeared at the crank angle signal in a one-pulse width duration between two adjacent edges of the intake cam angle signal and continues it until the position of the crankshaft 33 is identified.

When two or more edges have already appeared at the intake cam angle signal after expiry of the starter mask time, and an edge having appeared last belongs to the intake cam angle signal, the microcomputer 5 reads in step 430 the number Np as counted by the above counting function (i.e., the number of trailing edges of the crank angle signal between two adjacent edges having appeared last at the intake cam angle signal). The microcomputer 5 determines the position of the crankshaft 33 based on the number Np and enters a corresponding value in the crank counter. The intake cam angle signal is, as described above, made up of a pulse train in which intervals between adjacent pulses equivalent to the same angle of rotation of the crankshaft 33 do not appear, thus enabling the microcomputer 5 to use the number Np to determine which of the edge numbers E1, E3, E5, E6, E9, E12, E13, E15, E16, and E19 is the number of an edge having appeared last and to enter a value corresponding to the determined one in the crank counter. Alternatively, if two or more edges have not yet appeared in an intake cam angle signal after expiry of the starter mask time or an edge having appeared last belongs to the exhaust cam angle signal, the microcomputer 5 does not perform the operation in step 430.

After step 430, the routine proceeds to step 250, as described above.

As apparent from the above discussion, the engine control system 1 works to estimate the position at which the crankshaft 33 is expected to stop (i.e., the stop position estimate) when the ignition switch 45 is turned off, so that the engine 3 is starting to decelerate, and the speed of the engine 3 drops below the value TH1. Upon stop of the engine 3, the engine control system 1 stores therein the edge number assigned to an edge having appeared last at either of the intake or exhaust cam angle signal as the stop position estimate. Afterward, when the ignition switch 45 is turned on to start the engine 3, the engine control system 1, and when one of the edges E1 to E20 has appeared first after expiry of the starter mask time, the engine control system 1 determines a corresponding count value based on the stop position estimate stored in the memory 6 and enters it in the crank counter as indicating the position of the crankshaft 33 upon appearance of the one of the edges E1 to E20, thereby specifying the position of the crankshaft 33. The engine control system 1 then analyzes the current position of the crankshaft 33 and commences the control of the engine 3.

The engine control system 1 is, therefore, permitted to find the position of the crankshaft 33 at substantially the same time as the engine 3 starts to be cranked by the starter and commence the control of the engine 3. Specifically, when it is determined in step 170 of FIG. 3 that the angular position of the crankshaft 33 has reached a multiple of 36° CA from 6° BTDC of the fourth cylinder #4, the engine control system 1 starts to perform the control tasks for the engine 3.

When the engine 3 is not yet warmed up sufficiently, the viscosity of engine oil is usually kept high, thus causing the engine 3 or the crankshaft 33 to undergo the resistance to rotation thereof. This may result in a difficulty in determining the stop position estimate correctly in step 330. For instance, when the engine 3 is undergoing the resistance to rotation thereof, it will cause the tension of a timing belt or a timing chain used to rotating the intake cam shaft 37 and the exhaust cam shaft 41 in synchronization with the crankshaft 33 to change, so that the phase difference between rotation of the intake cam shaft 37 and the exhaust cam shaft 41 and rotation of the crankshaft 33 changes, which may cause the waveforms, the edge-to-edge intervals, the times when the edges appear, and the order of appearance of the edges of the intake cam angle signal and the exhaust cam angle signal to be different from expected ones, thereby resulting in a difficulty in determining the stop position estimate. Additionally, when the engine 3 is undergoing the resistance to rotation thereof, it may result in an increased possibility that the crankshaft 33 is reversed in rotation slowly without passing the position matching the TDC of the piston of any of the cylinders. The engine control system 1 may have a difficulty in detecting such an event.

In order to avoid the above problem, the engine control system 1 is designed to perform the operations in steps 280 to 320. Specifically, when the temperature of the cooling water is less than the value TH2, the engine control system 1 concludes that the engine 3 is not yet warmed up sufficiently and undergoing the resistance to rotation thereof and there is a possibility of a difficulty in estimating the position at which the crankshaft 33 is expected to stop correctly and inhibits the estimation of the stop position of the crankshaft 33 in step 330.

When the battery voltage VB is lower than the value TH3, it may cause the characteristics of the crankshaft position sensor 35, the intake camshaft position sensor 39, and the exhaust camshaft position sensor 43 and characteristics of the input circuit 9 to shape the waveforms of the outputs from the sensors 35, 39 and 43 to change, thus resulting in a difficulty in estimating the stop position of the crankshaft 33 correctly. Further, when at least one of the crank angle signal, the intake cam angle signal, and the exhaust cam angle signal has failed to be inputted to the engine control system 1 correctly due to, for example, a malfunction or a wire disconnection of the sensor 35, 39, or 45 from the engine control system 1, it will result in a difficulty in estimating the stop position of the crankshaft 33 correctly in step 330. In order to eliminate such a problem, when it is determined in step 290 that the battery voltage VB is lower than the value TH3 or when it is determined in step 300 that at least one of the crank angle signal, the intake cam angle signal, and the exhaust cam angle signal inputted to the microcomputer 5 has some error, the engine control system 1 inhibits the estimation of the stop position of the crankshaft 33 in step 330.

Further, when the engine 3 has stalled as soon as it has started up or when the vehicle driver has turned off the starter switch to stop cranking the engine 3 before the engine 3 starts up, it sometimes results in a sharp drop in speed of the engine 3, which may lead to a difficulty in estimating the stop position of the crankshaft 33 correctly in step 330. In order to eliminate this drawback, when it is determined in step 310 that the speed of the engine 3 has not exceeded the value TH1 during the on-state of the ignition switch 45 or in step 320 that wherein the engine start elapse time has not yet reached the time TH4, the engine control system 1 inhibits the estimation of the stop position of the crankshaft 33 in step 330. Specifically, when the engine 3 is going to stop or has stopped, and when conditions in which the speed of the engine 3 has once exceeded the value TH1, in other words, the engine 3 has started once completely and the elapsed time since start-up of the engine 3 is greater than the value TH4 are not met, the engine control system 1 inhibits the operation in step 330 to avoid the estimation of the stop position of the crankshaft 33 at an unusual stop of the engine 3. The determination of whether the engine 3 is going to stop or has stopped normally or unusually may alternatively be made by recording a history on operating conditions of the engine 3, for example, after and before turning on and off the ignition switch 45 and searching the history to find an operating condition of the engine 3 just before the speed of the engine 3 falls in a stop position estimation permissible range (i.e., 0 to TH1).

In the event that the estimation of the stop position of the crankshaft 33 in step 330 has been inhibited at the stop of the engine 3, the engine control system 1 determines in step 380 at a subsequent start of the engine 3 that the stop position estimate is not retained in the memory 6 and skips over steps 390 to 410. In this case, the position of the crankshaft 3 is determined in either of a sequence of steps 110 to 130 of FIG. 3 or step 400 of FIG. 4, in other words, the count of the crank counter is set, after which the engine control system 1 initiates the control of the engine 3 in step 180 of FIG. 3.

As apparent from the above discussion, there is the possibility of a difficulty in estimating the stop position of the crankshaft 33 in step 330, the engine control system 1 inhibits such estimation to avoid an error in performing engine start control such as ignition or fuel injection control at the start of the engine 3 using the estimate of the stop position of the crankshaft 33, thereby ensuring the startability of the engine 3 and avoiding the deterioration of exhaust emissions of the engine 3 arising from an incorrect estimate of the stop position of the crankshaft 33.

If of the crank angle signal, the intake cam angle signal, and the exhaust cam angle signal, the intake cam angle signal or the exhaust cam angle signal inputted to the microcomputer 5 at the start of the engine 3 is an error signal the engine control system 1 skips steps 390 to 410 of FIG. 4 and does not specify the position of the crankshaft 33 in either of a sequence of steps 110 to 130 of FIG. 3 or step 400 of FIG. 4, thus resulting in the impossibility of starting the engine 3, but avoiding the deterioration of exhaust emissions of the engine 3 arising from errors of ignition and fuel injection control using the incorrect estimate of the stop position of the crankshaft 33.

The impossibility of starting the engine 3 may be eliminated using a failsafe system designed to determine the position of the crankshaft 33 based on one of the crank angle signal, the intake cam angle signal, and the exhaust cam angle signal which has been determined to be correct For instance, if the crank angle signal is detected as being an error signal or the engine 3 is not equipped with the crankshaft position sensor 35, it is possible to determine the position of the crankshaft 33 and measure the speed of the engine 3 only using the intake cam angle signal for controlling the engine 3. The determination of the position of the crankshaft 33 may be achieved by measuring the edge-to-edge interval of the intake cam angle signal every appearance of the edge thereat and finding a unique sequence thereof. For instance, if the 96° CA interval, the 18° CA interval, and the 126° CA interval, as demonstrated in FIG. 2, are found in sequence, at the intake cam angle signal, the engine control system 1 may determine that the position of the crankshaft 33 upon appearance of a trailing edge of a pulse ranging over the 126° CA interval is at 33° BTDC of the fourth cylinder #4 of the engine 3. The intake camshaft position sensor 39 is, as already described, so designed that the trailing edges of the intake cam angle signal appear at 33° BTDC of the first to fourth cylinders of the engine 3 at a regular interval of 144° CA, respectively. The speed of the engine 3 or time equivalent to, for example, 1° CA may, therefore, be determined by measuring a time interval between the trailing edges of the intake cam angle signal.

The exhaust camshaft position sensor 43 is so designed that the exhaust cam angle signal, as demonstrated in FIG. 2, has different levels upon appearances of the trailing edges of adjacent two of the non-pulse portions K of the crank angle signal. Therefore, if the intake cam angle signal is detected as being an error signal, the determination of the position of the crankshaft 33 may be achieved by monitoring the level of the exhaust cam angle signal and entering a value corresponding the monitored level in the crank counter in steps 120 and 130 of FIG. 3 instead of using the intake cam angle signal.

The engine control system 1 also works to initiate the estimation of the stop position of the crankshaft 33 only when the speed of the engine 3 is lower than the value TH1, thus keeping operation loads of the microcomputer 5 low.

Steps 400 and 430 of FIG. 4 are omitted if the position of the crankshaft 33 has already been specified, while steps 110 to 130 of FIG. 3 (i.e., the detection of the non-pulse portion K of the crank angle signal to determine the position of the crankshaft 33 for identifying the cylinders of the engine 3) continue to be performed after the position of the crankshaft 33 is found. This is for returning the count of the crank counter to a correct one upon appearance of the non-pulse portion K at the crank angle signal if the count of the crank counter is shifted in error due to addition of noises to the crank angle signal.

At the start of the engine 3, the engine control system 1 performs in steps 350 to 370 the same operations as those in steps 280 to 300 which are to be performed at the stop of the engine 3. Specifically, if the stop position estimate is recorded in the memory 6, but any of the conditions in steps 350 to 370 is not encountered at the start of the engine 3, the engine control system 1 does not specify the position of the crankshaft 33 using the stop position estimate, that is, does not commence the control of the engine 3. This is for using the stop position estimate under the same conditions as those for allowing the stop position estimate to be determined in step 330 in order to ensure the accuracy in determining the position of the crankshaft 33 using the stop position estimate. The value TH2 used in step 350 may be different from that in step 280. Similarly, the value TH3 used in step 360 may be different from that in step 290. This is because requirements for ease of rotation of the engine 3 may be thought to be different between the start and the stop of the engine 3. Steps 35 to 370 may be omitted depending upon the logic of determining the stop position estimate of the crankshaft 33 in step 330 or the logic of how to use the stop position estimate to find the position of the crankshaft 33 in step 400.

The engine control system 1 concludes in step 280 that the engine 3 is subjected to the resistance to rotation thereof when the temperature of cooling water of the engine 3 is lower than the value TH2, but however, it may be achieved using the temperature of ambient air, intake air to the engine 3, fuel supplied to the engine 3, oil controlled by the oil control valve 53 or 57 (which will be referred to as OCV oil below), or engine oil, the viscosity or quantity of the engine oil, or the viscosity of the OCV oil.

The value TH3 that is a threshold of the battery voltage VB used in step 290 may be fixed or changed with a change in consumption of electrical energy of the battery 67. For instance, the value TH3 is increased with an increase in such energy consumption. The microcomputer 5 may have installed therein a data map listing relations among the level of the battery voltage VB, an electric load on the battery 67, and the threshold and looking up in the data map to find the threshold as the value TH3 which corresponds to the level of the battery voltage VB and the electric load on the battery 67.

If the variable valve timing mechanism 51 or 55 is activated when the requirement for transition from step 270 to step 280 is met, it causes the times the edges are to appear at the intake or exhaust cam angle signal or the order of appearance thereof to be changed from expected ones, thus resulting in an error in estimating the stop position of the crankshaft 33 in step 330. In order to avoid this problem, the engine control system 1 may be designed to monitor the activities of the variable valve timing mechanisms 51 and 55 and inhibit the estimation in step 330 if the phase difference in rotation between the intake camshaft 37 or the exhaust cam shaft 41 and the crankshaft 33 is determined to have been shifted by the variable valve timing mechanism 51 or 55.

The engine control system 1 may be designed to store one of the edge numbers E1 to E20 following one assigned to the edge, as detected to have appeared at either of the intake or exhaust cam angle signal, in the memory 6 as the stop position estimate in step 330 of FIG. 4. In this case, the engine control system 1 finds the position of the crankshaft 33 matching the edge indicated by the one of the edge numbers E1 to E20 stored in the memory 6 and sets the value corresponding to the determined position in the crank counter.

The engine control system 1 may be designed to determine in step 330 which of the edge numbers E1 to E20 is assigned to the edge appeared in this program cycle at either of the intake or exhaust cam angle signal only based on histories on statuses (e.g., patterns of change in level or changes in edge-to-edge interval) of the intake and exhaust cam angle signals inputted already to the microcomputer 5. In this case, the estimation of the stop position of the crankshaft 33 is achieved based on the intake and exhaust cam angle signals without use of the crank angle signal.

The estimation of the stop position of the crankshaft 33 may alternatively be made only using the crank angle signal. For example, between step 150 or step 160 and step 170 of FIG. 3, the engine control system 1 performs the same operations as those in step 210 and steps 270 to 320 of FIG. 4. If the ignition switch 45 is determined to be in the off-state, and the same conditions as in steps 270 to 320 are all met, the engine control system 1 reads an instantaneous count out of the crank counter and store it in the memory 6 as the stop position estimate. For example, if the crankshaft 33 is not at a position where the non-pulse portion K will appear at the crank angle signal, but the pulse interval of the crank angle signal, as detected last, is determined to be given times greater than that, as detected one cycle earlier, the engine control system 1 may determine that the crankshaft 33 has reversed in rotation and correct or return the count of the crank counter and the stop position estimate stored in the memory 6 back to previous ones, thereby improving the accuracy in estimating the stop position of the crankshaft 33. In this case, when an edge is detected as having appeared at either of the intake or exhaust cam angle signal at the start of the engine, the engine control system 1 may determine that edge as immediately following one, as represented by the stop position estimate (i.e., the count of the crank counter) stored in the memory 6 and specify the current position of the crankshaft 33 based on the edge detected.

The engine control system 1 is designed to hold the control of the engine 3 from being initiated until the starter mask time in which noises would be added to the crank angle signal expires. The control of the engine 3 may, however, be allowed to be initiated by performing the injection of fuel into the engine 3 upon timer interruption during the starter mask time.

The engine control system 1 may alternatively be designed to receive either of the intake or exhaust cam angle signal in addition to the crank angle signal.

The non-tooth portion is, as described above, formed on the circumference of the rotor 69 of the crankshaft 33 to define the reference position of the crankshaft 33, but however, the reference position may be settled by installing an additional tooth between adjacent two of teeth formed on the circumference of the rotor 69 at equi-intervals or alternatively lengthening only one of the teeth.

The invention may be used with engine controllers which are not equipped with the crankshaft position sensor 35 and designed to determine the position of the crankshaft 33 and the speed of the engine 3 only using outputs of the intake and exhaust camshaft position sensors 39 and 43.

Figure 5:
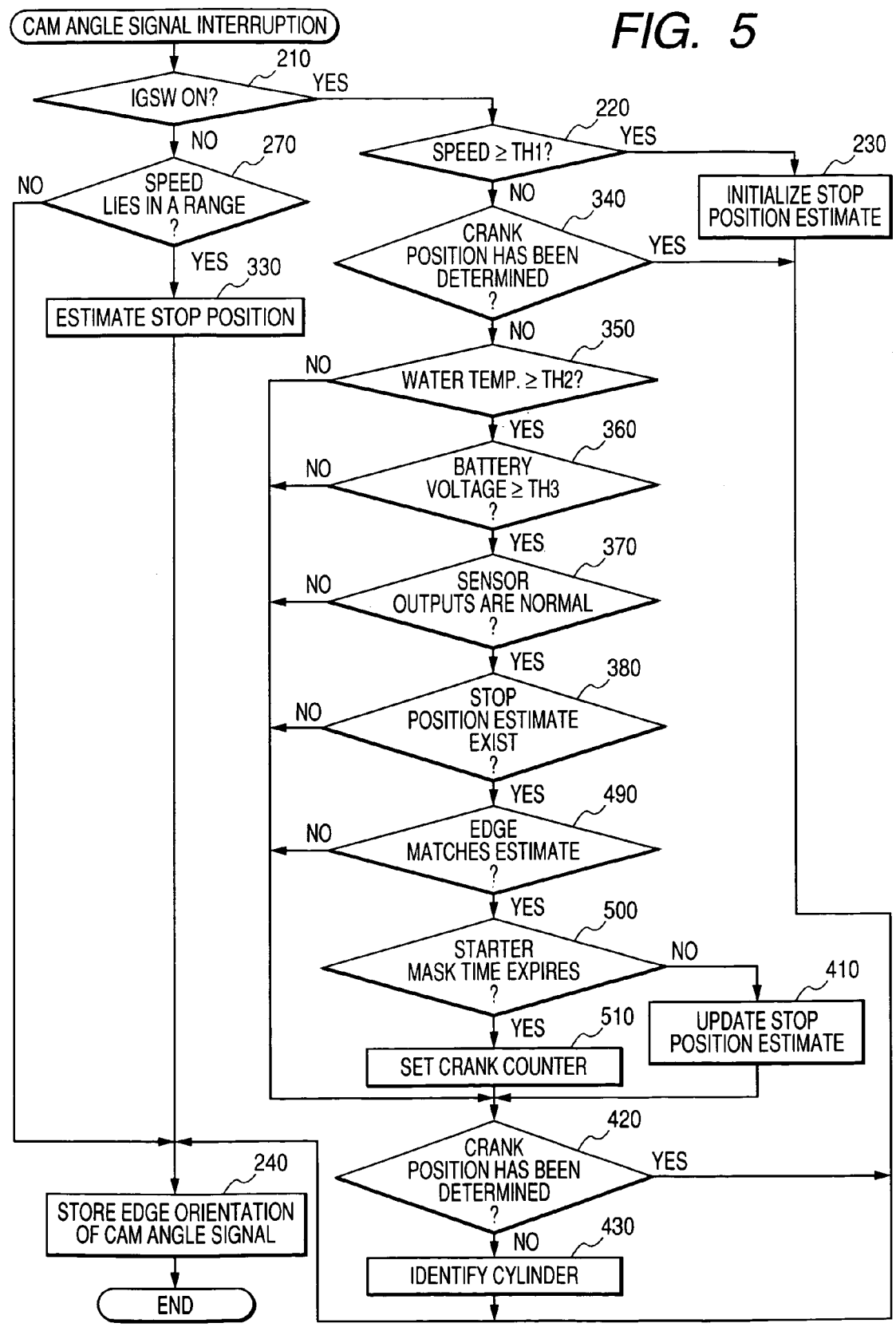
FIG. 5 is a flowchart of a program to be executed by an engine control system according to the second embodiment every input of a signal outputted form one of an intake and an exhaust camshaft position sensor.

FIG. 5 shows a cylinder identification program according to the second embodiment of the invention which is to be executed by the microcomputer 5 each time each time edge appears at either one of the intake and exhaust crank signals, as produced by the intake and exhaust camshaft position sensors 39 and 43. The same step numbers as those in FIG. 4 will refer to the same operations, and explanation thereof in detail will be omitted here.

First, in step 210, it is determined whether the ignition switch 45 is in the on-state or not. If a YES answer is obtained meaning that the ignitions switch 45 is in the on-state, then the routine proceeds to step 220. Alternatively, if a NO answer is obtained meaning that the ignition switch 45 is in the off-state, and a time span during which the engine 3 will stop soon has been entered, then the routine proceeds to step 270 wherein the speed of the engine 1 lies within a range of 0 rpm to the value TH1 or not. If a NO answer is obtained, then the routine proceeds directly to step 250. Alternatively, if a YES answer is obtained, then the routine proceeds to step 330 wherein the angular position at which the crankshaft 33 is expected to stop is estimated in the same manner as described in FIG. 4. After step 330, the routine proceeds to step 250 and then terminates. If a NO answer is obtained in step 270, then the routine proceeds directly to step 250.

If a YES answer is obtained in step 210 meaning that the ignitions switch 45 is in the on-state, then the routine proceeds to step 220 wherein the speed of the engine 3 is greater than or equal to the value TH1 or not. The speed of the engine 3 is calculated as a function of the pulse interval as derived and stored in step 105 of FIG. 3. If a YES answer is obtained in step 220 meaning that the speed of the engine 3 is greater than or equal to the preselected value TH1, then the routine proceeds to step 230 wherein the memory 6 is initialized to erase the stop position estimate that is an estimate of an angular position at which the crankshaft 3 is expected to stop. The routine proceeds to step 250 and then terminates.

If a NO answer is obtained in step 220 meaning that the speed of the engine 3 is less than the value TH1, that is, that the engine 3 is in a starting phase, then the routine proceeds to step 340. Steps 340 to 380 are, as described above, substantially identical in operation with those in FIG. 4.

The microcomputer 5 of this embodiment is designed to run an initial check function upon start thereof following the turning on of the ignition switch 45 to check whether all the crank angle signal, the intake cam angle signal, and the exhaust cam angle signal are being inputted correctly or not. If any of the signals is found as an error signal, the microcomputer 5 stores an input signal error history record indicating such an event in the RAM and the memory 6. Specifically, the microcomputer 5 is designed to sample the level of each of the intake and exhaust cam angle signals immediately before the stop thereof and record it in the memory 6. Upon start, the microcomputer 5 works to sample the level of each of the intake and exhaust cam angle signals being inputted thereinto and compare it with a corresponding one of the levels stored in the memory 6 to determine whether they match each other or not. If either of the intake or exhaust cam angle signals, as sampled at the start of the microcomputer 5, is determined as unmatching the one stored in the memory 6, the microcomputer 5 determines that it is an error signal. The microcomputer 5 also works to sample the level of the crank angle signal upon the start thereof and determine whether it matches the level (i.e., the low level) or not that is to be before the engine 3 is cranked. If they disagree with each other, the microcomputer 5 determines that it is an error signal. Additionally, the microcomputer 5, as described above, also works to perform the monitoring function to monitor the level of each of the crank angle signal, the intake cam angle signal, and the exhaust cam angle signal during the on-state thereof. If any one of the crank angle signal, the intake cam angle signal, and the exhaust cam angle signal has been changed in level, but the others remain unchanged for a given period of time, the microcomputer 5 stores an input signal error history record indicating the fact that the others are error signals in the RAM and the memory 6. The microcomputer 5 looks up the input signal error history records in step 370 and determines whether each of the intake and exhaust cam angle signals being inputted thereinto is a correct signal or not.

If a YES answer is obtained in step 370, then the routine proceeds to step 380 wherein the stop position estimate is retained in the memory 6 or not. If a YES answer is obtained, then the routine proceeds to step 490 wherein the edge that has appeared in this program cycle at either of the intake or exhaust cam angle signal corresponds to the stop position estimate, as stored in the memory 6 or not. Specifically, at the start of the engine 3, one of the edge numbers E1 to E20 just preceding one thereof assigned to the edge having appeared in this program cycle is to be stored in the memory 6 as the stop position estimate. Thus, as long as the stop position estimate, as stored in the memory 6 is identical with the position of the crankshaft 33 which stopped actually, one of the edge numbers E1 to E20 assigned to the edge having appeared at either of the intake or exhaust cam angle signal in this program cycle must agree with one of the edge numbers E1 to E20 just following one thereof stored in the memory 6 as the stop position estimate. In step 490, the microcomputer 5 determines at which of the intake and exhaust cam angle signals the edge has appeared in this program cycle and whether the edge is a leading or a trailing one, and monitors the level of one of the intake and exhaust cam angle signal at which the edge has not appeared to decide whether the edge number of the edge having appeared in this program cycle is identical with one of the edge numbers E1 to E20 just following one thereof stored in the memory 6 as the stop position estimate or not.

For instance, if the crankshaft 33 stopped between the edges E20 and E1 in FIG. 2, the edge E20 was stored in the memory 6 as the stop position estimate in step 330 at the stop of the engine 3. The edge of the edge number E1 will, therefore, occur at a subsequent start of the engine 1. If the trailing edge has first appeared at the intake cam angle signal at the start of the engine 1, and the exhaust cam angle signal is in the high level, the microcomputer 5 determines in step 490 that the edge number of the edge, as detected in this program cycle, is E1 which agrees with the one stored in the memory 6.

The microcomputer 5 is designed to enter an edge history record in an internal resistor upon occurrence of the edge at either of the intake or exhaust cam angle signal. The edge history record indicates at which of the intake and exhaust cam angle signals the edge has appeared and the orientation of the edge, that is, whether the edge is a leading or a trailing one. The microcomputer 5 analyzes the edge history record in step 490 and determines at which of the intake and exhaust cam angle signals the edge, as detected in this program cycle, has appeared and the orientation thereof. The orientation of the edge may alternatively be determined by sampling the level of one of the intake and exhaust cam angle signals at which the edge has appeared without using the edge history record.

If a YES answer is obtained in step 490, then the routine proceeds to step 500 wherein it is determined whether the starter mask time expires or not. If a YES answer is obtained, then the routine proceeds to step 510 wherein the current position of the crankshaft 33 is determined based on the stop position estimate retained in the memory 6 (i.e., the angular position of the crankshaft 3 when the edge appeared in this program cycle at one of the intake and exhaust cam angle signals), and the value corresponding to the determined position of the crankshaft 33 is set in the crank counter. Specifically, one of the edge numbers E1 to E20 just preceding one thereof assigned to the edge which has appeared at either one of the intake and exhaust cam angle signals in this program cycle must be stored in the memory 6. The microcomputer 5, thus, determines in step 510 that the edge of the intake or exhaust cam angle signal to which one of the edge numbers E1 to E20 following that stored in the memory 6 is assigned represents the current position of the crankshaft 33 and enters a corresponding value in the crank counter. For instance, if the crankshaft 33 stopped between the edges E20 and E1 in FIG. 2, the edge E20 was stored in the memory 6 as the stop position estimate in step 330 at the stop of the engine 3. If the starter mask time is released before the edge E1 appears at the intake cam angle signal at a subsequent start of the engine 3, a number 67 assigned to the edge E1 of the intake cam angle signal appearing following the edge E20 of the exhaust cam angle signal is entered in the crank counter in step 510. The microcomputer 5 reads the number 67 out of the crank counter and specifies the position of the crankshaft 33 at the current start of the engine 3.

After step 510, the routine proceeds to step 420. If a NO answer is obtained in step 500 meaning that the starter mask time does not yet expire, then the routine proceeds to step 410 wherein the edge number stored in the memory 6 as the stop position estimate is updated to one of the edge numbers E1 to E20 following the one stored in the memory 6. Specifically, when one of the edges E1 to E20 has appeared first after expiry of the starter mask time, a corresponding value is, as described above, set in the crank counter in step 510 as indicating the position of the crankshaft 33 upon appearance of the one of the edges E1 to E20. Therefore, when the starter mask time does not yet expire, the stop position estimate stored in the memory 6 is incremented by one (1) in step 410. The routine then proceeds to step 420.

If a NO answer is obtained in any one of steps 350, 360, 370, 380, and 490, then the routine proceeds directly to step 420.

In step 420, it is determined whether the angular position of the crankshaft 33 has been identified or not. If a YES answer is obtained, then the routine proceeds directly to step 250. Alternatively, if a NO answer is obtained, then the routine proceeds to step 430. Therefore, when it has been concluded in step 340 that the angular position of the crankshaft 33 is not yet identified, but the operation in step 510 has been completed, it is determined in step 420 that the angular position of the crankshaft 33 has been identified. The routine then proceeds to step 250. Alternatively, if the operation in step 400 has not been completed, the routine proceeds from step 420 to step 430.

In step 430, the cylinders of the engine 3 are identified using the intake cam angle signal in the same manner as described in FIG. 4. The routine proceeds to step 250 and then terminates.

If the stop position of the engine 3 has changed for some cause after the stop thereof, it will cause the stop position estimate stored in the memory 6 to unmatch an actual position of the crankshaft 33 upon a subsequent start of the engine 3. If the engine 3 has stopped under unexpected environmental or operational conditions, it may also result in a difficulty in estimating the stop position of the crankshaft 33 correctly in step 330 of FIG. 5. In order to avoid these problems, upon appearance of the edge at either of the intake or exhaust cam angle signal at the start of the engine 3, the microcomputer 5 works to determine in step 490 whether the edges matches the stop position estimate stored in the memory 6 and, if they match each other, determine the position of the crankshaft 33 based on the stop position estimate to initiate the control tasks for the engine 3. Alternatively, if the edge is determined in step 490 as unmatching the stop position estimate, the microcomputer 5 concludes that a mismatch has occurred between the actual position of the crankshaft 33 and the stop estimate position for some cause and skips steps 500 to 410 of FIG. 5. In such an event, the microcomputer 5 does not use the stop position estimate and finds the position of the crankshaft 33 through a sequence of steps 110 to 130 of FIG. 3 or step 430 of FIG. 5 to commence the control tasks for the engine 3.

The microcomputer 5 may be designed to enter, in step 330 of FIG. 5, one of the edge numbers E1 to E20 following one thereof assigned to the edge, as detected to have appeared at either of the intake or exhaust cam angle signal in the current program cycle. In this case, the microcomputer 5 determines, in step 490, whether the edge number of the edge, as detected, is identical with the stop position estimate stored in the memory 6 or not and, in step 510, enters the value indicating the position of the crankshaft 33 matching the edge number (i.e., the stop position estimate) stored in the memory 6 in the crank counter.

The microcomputer 5 may be designed to determine in step 330 which of the edge numbers E1 to E20 is assigned to the edge appeared in this program cycle at either of the intake or exhaust cam angle signal only based on histories on statuses (e.g., patterns of change in level or changes in edge-to-edge interval) of the intake and exhaust cam angle signals inputted already to the microcomputer 5. In this case, the estimation of the stop position of the crankshaft 33 is achieved based on the intake and exhaust cam angle signals without use of the crank angle signal.

The estimation of the stop position of the crankshaft 33 may alternatively be made only using the crank angle signal. For example, between step 150 or step 160 and step 170 of FIG. 3, the engine control system 1 performs the same operations as those in step 210 and step 250 of FIG. 5. If the ignition switch 45 is determined to be in the off-state, and the speed of the engine 3 is determined as lying within a given range (i.e., less than the value TH1), the microcomputer 5 reads an instantaneous count out of the crank counter and store it in the memory 6 as the stop position estimate. For example, if the crankshaft 33 is not at a position where the non-pulse portion K will appear at the crank angle signal, but the pulse interval of the crank angle signal, as detected last, is determined to be given times greater than that, as detected one cycle earlier, the microcomputer 5 may determine that the crankshaft 33 has reversed in rotation and correct or return the count of the crank counter and the stop position estimate stored in the memory 6 back to previous ones, thereby improving the accuracy in estimating the stop position of the crankshaft 33. In this case, when an edge is detected as having appeared at either of the intake or exhaust cam angle signal at the start of the engine, the microcomputer 5 may consider that edge as immediately following one, as represented by the stop position estimate (i.e., the count of the crank counter) stored in the memory 6 and specify the current position of the crankshaft 33 based on the edge detected.

The engine control system 1 may alternatively be designed to have the possibility that the microcomputer 5 lines up a plurality of candidates of stop positions of the crankshaft 33 in step 330. In this case, the following operations are performed in step 490 at the start of the engine 3.

If there are a plurality of stop position estimate of the crankshaft 33 in the memory 6, the microcomputer 5 works to determine whether there are ones of the stop position estimates which match the edge having appeared upon start of the engine 3 or not and commence any of operations (a) to (c), as described below.

(a) If the edge, as detected, does not match any of the stop position estimates, the microcomputer 5 concludes that all of the stop position estimates are incorrect and has the routine of FIG. 5 proceed from step 490 directly to step 420.

(b) If the edge, as detected, matches only one of the stop position estimates, the microcomputer 5 determines the one as being correct, erases the others from the memory 6, and then has the routine of FIG. 5 proceed from step 490 to step 500.

(c) If the edge, as detected, matches two or more of the stop position estimates, the microcomputer 5 erases the others from the memory 6 as not being candidates of the stop position of the crankshaft 33, updates each of the two or more of the stop position estimates to a subsequent one of the edge numbers E1 to E20, and has the routine of FIG. 5 proceed from step 490 to step 420. Therefore, when the edge has appeared at either of the intake or exhaust cam angle signal in a subsequent program cycle and is determined in step 490 as matching one of the stop position estimates, the microcomputer 5 is allowed to specify one of the stop position estimates which may be viewed as matching an actual stop position of the crankshaft 33 and find the position of the crankshaft 33 based on the one of the stop position estimate.

FIGS. 6 to 11 show operations of the microcomputer 5 according to the third embodiment of the invention. The same step reference numbers as employed in the first and second embodiments will refer to the same operations.

Figure 6:
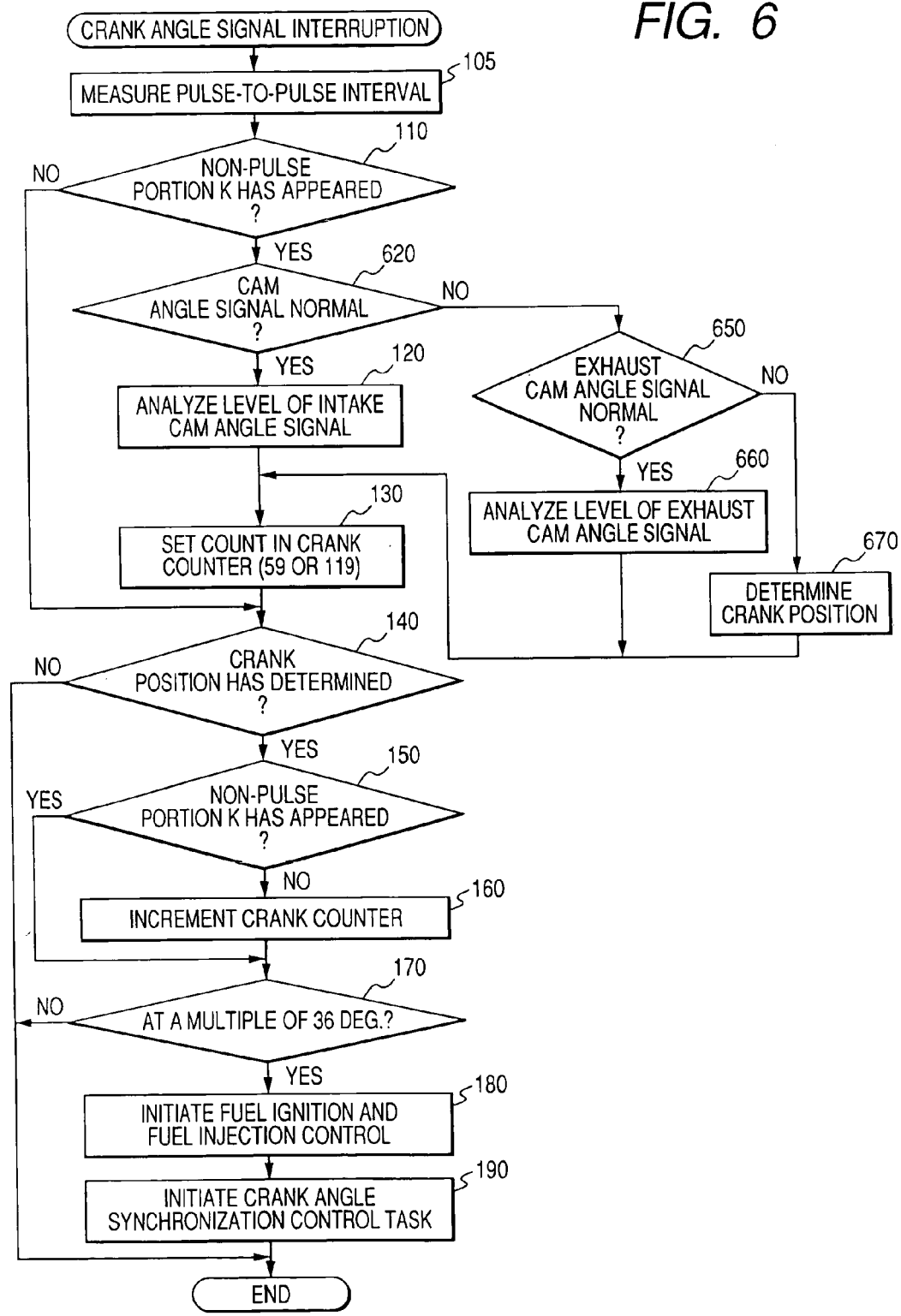
FIG. 6 is a flowchart of a program to be executed by an engine control system according to the third embodiment of the invention every input of a signal outputted from a crankshaft position sensor.

FIG. 6 is a flowchart of a crank angle signal-interruption program to be initiated, like the one of FIG. 3, cyclically every input of the trailing edge of the crank angle signal to determine the position of the crankshaft 33.

After entering the program, the routine proceeds to step 105 wherein a time interval between initiations of the program one cycle earlier and in this cycle is calculated and stored as a pulse interval of the crank angle signal. Note that when the program is commenced for the first time after the start of the microcomputer 5 following turning on of the ignition switch 45, a given maximum interval is stored as an initial value of the pulse interval.

The routine proceeds to step 110 wherein the pulse interval T1 stored in step 105 one program cycle earlier is compared with the pulse interval T0 stored in step 105 of this program cycle to determine whether a ratio of T1 to T0 (i.e., T1/T0) is greater than a preselected value H (e.g., 2.4) or not. This determination is made to determine whether the non-pulse portion K has appeared at the crank angle signal or not. If a YES answer is obtained meaning that the trailing edge of the crank angle signal, as derived in this program cycle, matches the end of the non-pulse portion K, then the routine proceeds to step 620. Alternatively, if a NO answer is obtained, then the routine proceeds directly to step 140. When the program is commenced for the first time after the start of the microcomputer 5 following turning on of the ignition switch 45, the pulse interval T0 is, as described above, set to the maximum interval, so that a NO answer will be obtained in step 110.

In step 620, it is determined whether an input from the intake camshaft position sensor 39 is a correct one or not to diagnose the operation of the intake camshaft position sensor 39. If a YES answer is obtained meaning that the intake camshaft position sensor 39 is operating normally, then the routine proceeds to step 120 wherein the level of the intake cam angle signal is analyzed.

The routine proceeds to step 130 wherein a value corresponding to the level of the intake cam angle signal, as analyzed in step 120, is set in the crank counter. Specifically, when the intake cam angle signal is determined to be in the low level, the microcomputer 5 concludes that the current angular position of the crankshaft 33 is at 12° BTDC of the piston of the fourth cylinder #4 and sets the count of the crank counter to 119 that is the last value before the count returns back to zero (0). Alternatively, when the intake cam angle signal is determined to be in the high level, the microcomputer 5 concludes that the current angular position of the crankshaft 33 is at 30° ATDC of the piston of the third cylinder #3 and sets the count of the crank counter to 59 that is the value smaller than 119 by 60 equivalent to 360° CA.

If a NO answer is obtained in step 620 meaning that the intake cam angle signal is an error signal, that is, the intake camshaft position sensor 39 is malfunctioning, then the routine proceeds to step 650 wherein it is determined whether an input from the exhaust camshaft position sensor 43 is a correct one or not to diagnose the operation of the exhaust camshaft position sensor 43. If a YES answer is obtained meaning that the exhaust camshaft position sensor 43 is operating normally, then the routine proceeds to step 660 wherein the level of the exhaust cam angle signal is analyzed. The routine proceeds to step 130 wherein a value corresponding to the level of the exhaust cam angle signal, as analyzed in step 650, is set in the crank counter. Specifically, when the exhaust cam angle signal is determined to be in the high level, the microcomputer 5 concludes that the current angular position of the crankshaft 33 is at 12° BTDC of the piston of the fourth cylinder #4 and sets the count of the crank counter to 119 that is the last value before the count returns back to zero (0). Alternatively, when the intake cam angle signal is determined to be in the low level, the microcomputer 5 concludes that the current angular position of the crankshaft 33 is at 30° ATDC of the piston of the third cylinder #3 and sets the count of the crank counter to 59.

If a NO answer is obtained in step 650 meaning that the intake and exhaust camshaft position sensors 39 and 43 are both malfunctioning, the routine proceeds to step 670 wherein a history on a change in the pulse interval of the crank angle signal, as stored in step 100, is analyzed to determine whether the pulse interval is decreasing or increasing to determine whether the current position of the crankshaft 33 is at 12° BTDC of the piston of the fourth cylinder #4 or 30° ATDC of the piston of the third cylinder #3. Specifically, when the position of the crankshaft 33 is at 12° BTDC of the fourth cylinder #4, it will result in increasing of the pulse interval due to a reactive force produced by compression of the air-fuel mixture in the fourth cylinder #4. Alternatively, when the position of the crankshaft 33 is at 30° ATDC of the third cylinder #3, it will result in decreasing of the pulse interval due to a reactive force produced by combustion of the air-fuel mixture within the third cylinder #3. Step 670 uses such a fact to determine the position of the crankshaft 33. The routine then proceeds to step 130 wherein 59 or 119 is entered in the crank counter.

After step 130, the routine proceeds to step 140 wherein the position of the crankshaft 33 has been identified or not. The fact that the angular position of the crankshaft 33 has been identified means that the angular position of the crankshaft 33 has been found after the start of the microcomputer 5 following turning on of the ignition switch 45, and more specifically, that the value indicating the angular position of the crankshaft 33 has been entered in the crank counter. When the value is entered in the crank counter in step 130 or step 740 or 760 of FIG. 7, as will be described later in detail, after the start of the microcomputer 5, a YES answer is obtained in step 140.

If a YES answer is obtained, then the routine proceeds to step 150. Steps 150 to 190 are the same as those in FIG. 3, and explanation thereof in detail will be omitted here.

Figure 7:
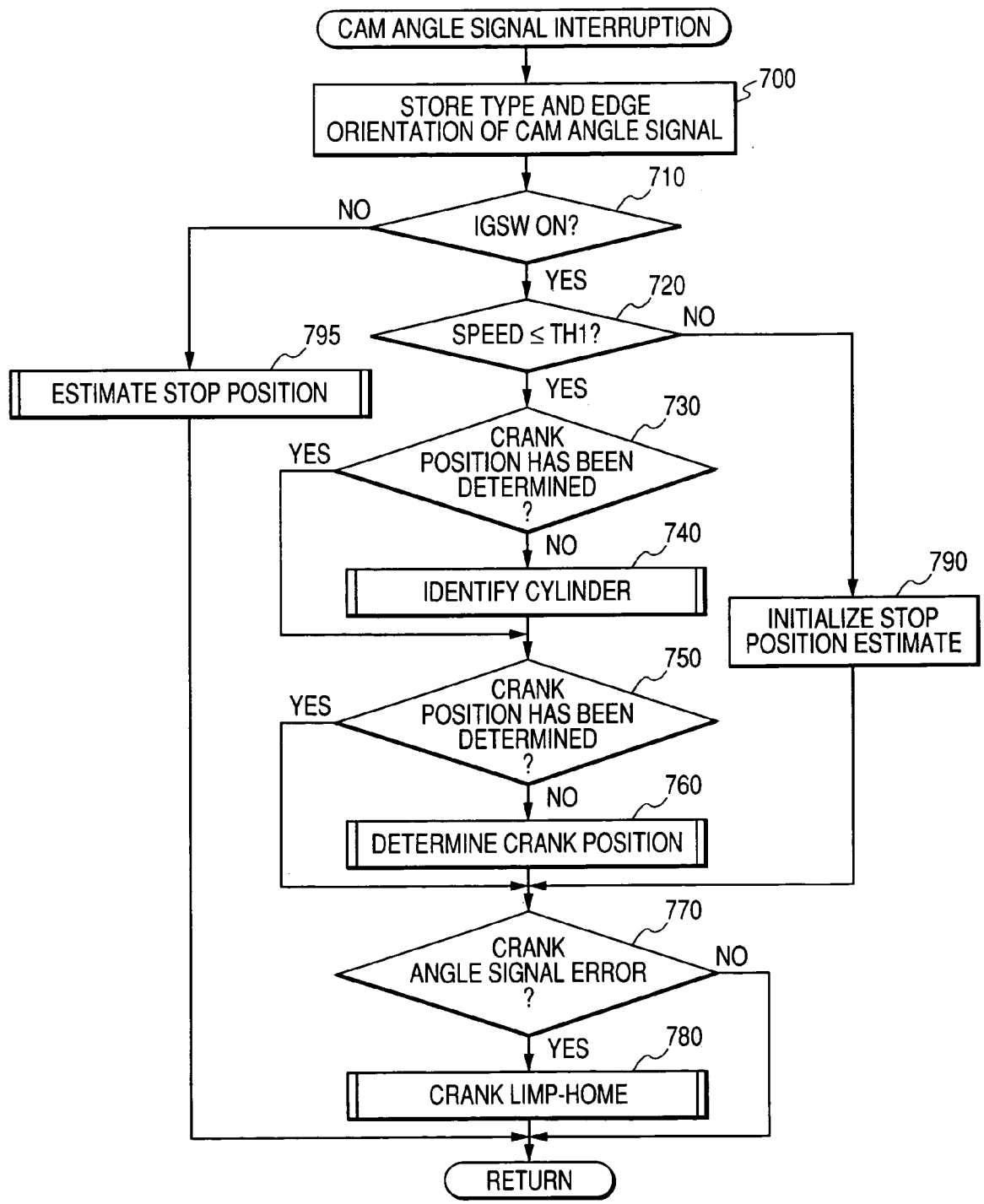
FIG. 7 is a flowchart of a program to be executed by an engine control system according to the third embodiment every input of a signal outputted form one of an intake and an exhaust camshaft position sensor.

FIG. 7 shows a cam angle signal-interruption program to be initiated every input of the edge appearing at either of the intake or exhaust cam angle signal to the microcomputer 5.

After entering the program, the routine proceeds to step 700 to determine which of the edges of the intake and exhaust signals the edge has been inputted and the orientation of the edge, that is, whether it is a leading or a trailing one. These data are stored in the microcomputer 5.

The routine proceeds to step 710 wherein it is determined whether the ignition switch 45 is in the on-state or not. If a YES answer is obtained meaning that the ignitions switch 45 is in the on-state, then the routine proceeds to step 720 wherein it is determined whether the speed of the engine 3 is less than or equal to a preselected value TH1 or not. The value TH1 is the value at which the engine 3 may be viewed as having been run by the engine control system 1 and which is, for example, 500 rpm slightly lower than a set idle speed of the engine 3. The speed of the engine 3 is calculated as a function of the pulse interval as derived and stored in step 105 of FIG. 3.

If a YES answer is obtained in step 720 meaning that the speed of the engine 3 is less than or equal to the preselected value TH1, then the routine proceeds to step 730. Alternatively, if a NO answer is obtained, then the routine proceeds to step 790 wherein the memory 6 is initialized to erase the stop position estimate that is an estimate of the angular position at which the crankshaft 3 is expected to stop and determined and stored in the memory 6 in step 795, as will be described later in detail.

In step 730, it is determined whether the position of the crankshaft 33 has bee found or not. If a NO answer is obtained, then the routine proceeds to step 740 wherein a cylinder identification task, as will be described later in detail, is performed. Alternatively, if a YES answer is obtained, then the routine proceeds directly to step 750.

In step 750, it is determined, like steps 730 or 150 of FIG. 3, whether the position of the crankshaft 3 has already been determined or not. If a YES answer is obtained, then the routine proceeds directly to step 770, Alternatively, if a NO answer is obtained, then the routine proceeds to step 760 wherein the position of the crankshaft 33 is determined using the stop position estimate in the manner, as will be described later in detail.

The routine proceeds to step 770 wherein an input from the crankshaft position sensor 35 is an erroneous one or not to diagnose the operation of the crankshaft position sensor 35. If a NO answer is obtained meaning that the crankshaft position sensor 35 is operating normally, then the routine terminates. Alternatively, if a NO answer is obtained, then the routine proceeds to step 780 wherein a crank limp home program is performed, as will be discussed later in detail, which updates the position of the crankshaft 33 without use of the crankshaft position sensor 35 for controlling of the engine 3.

Figure 8:
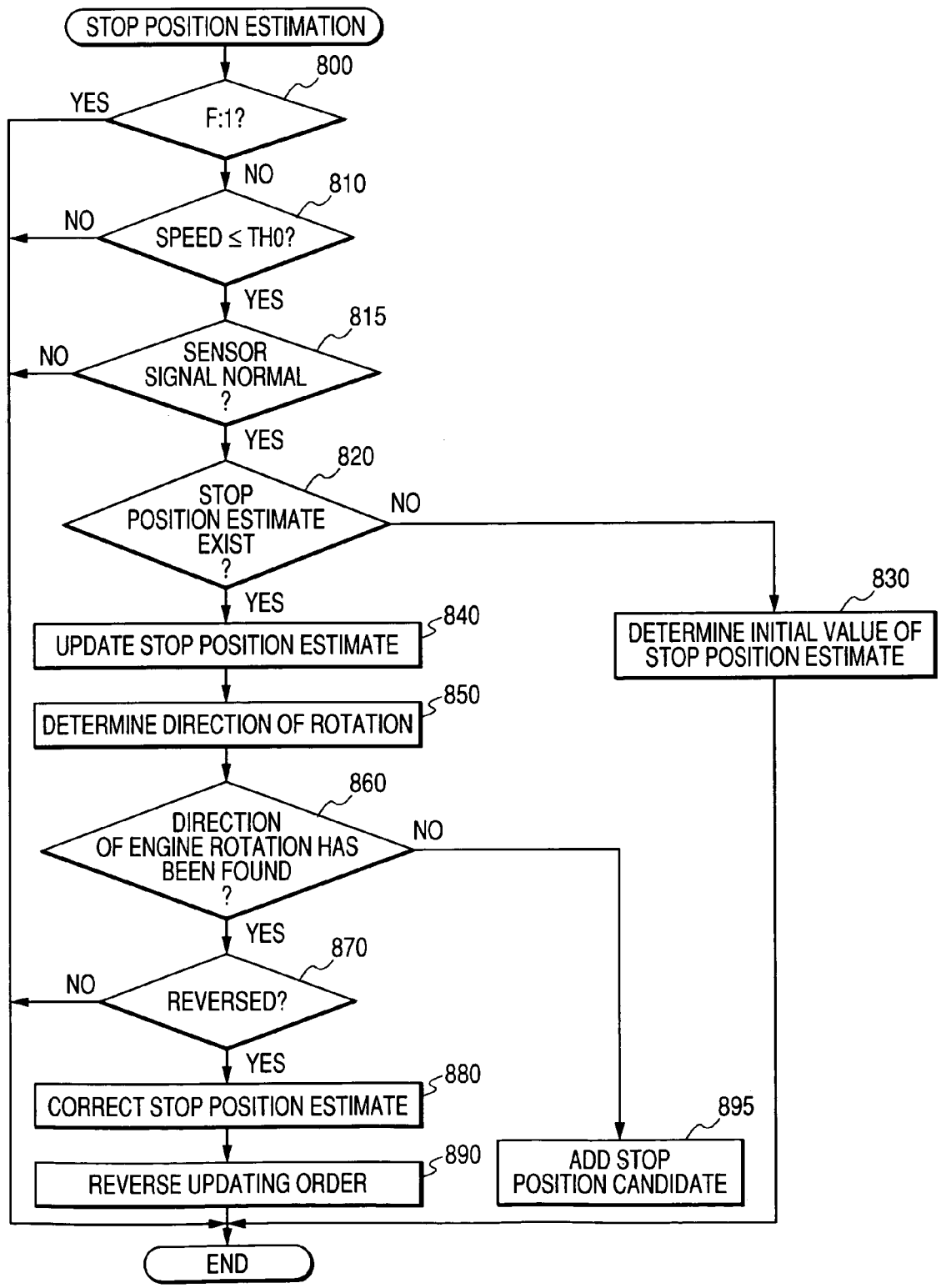
FIG. 8 is a flowchart of a sub-program to be executed in the program of FIG. 7 to estimate the stop position of a crankshaft of an engine.

FIG. 8 shows a stop position estimating program to be executed in step 795 of FIG. 7.

First, in step 800, an estimation inhibit flag F is one (1) or not. The flag F is to be reset to zero (0) upon start of the microcomputer 5 and set to one (1) at step 950, as will be described later in FIG. 9. If a YES answer is obtained (F=1), then the routine terminates. Alternatively, if a NO answer is obtained (F=0), then the routine proceeds to step 810 wherein it is determined whether the speed of the engine 3 is less than or equal to a given value TH0 or not. The speed of the engine 3 is determined using the pulse interval of the crank angle signal, as updated cyclically in step 110. The value TH0 is set to, for example, 500 rpm which is slightly lower than the idle speed of the engine 3 and identical with the value TH1, as described above.

If a NO answer is obtained in step 810, then the routine terminates. Alternatively, if a YES answer is obtained, then the routine proceeds to step 815 wherein it is determined whether the crank angle signal, the intake cam angle signal, and the exhaust cam angle signal are all being inputted to the microcomputer 5 correctly or not. If a NO answer is obtained meaning that at least one of the crank angle signal, the intake cam angle signal, and the exhaust cam angle signal is an erroneous one, then the routine terminates. Alternatively, if a YES answer is obtained meaning that all the crank angle signal, the intake cam angle signal, and the exhaust cam angle signal inputted to the microcomputer 5 are correct ones, then the routine proceeds to step 820 wherein it is determined whether the stop position estimate is already retained in the memory 6 or not.

If a NO answer is obtained in step 820, then the routine proceeds to step 830 wherein the value matching the count of the crank counter last updated in FIG. 6 is entered in the memory 6 as an initial value of the stop position estimate. The routine the terminates. The stop position estimate is, as described above, the position of the crankshaft 33 expected to stop and represented by one of the edge numbers E1 to E20, as illustrated in FIG. 2, which is assigned to the edge of the intake or exhaust cam angle signals used in this program cycle to initiate the program of FIG. 6.

Alternatively, if a YES answer is obtained in step 820 meaning that the stop position estimate is already recorded in the memory 6, then the routine proceeds to step 840 wherein the stop position estimate is updated. The updating is accomplished by incrementing one of the edge numbers E1 to E20 stored in the memory 6 by one (1). When the edge number E20 is in the memory 6, it is returned back to the initial number E1. Alternatively, when, in step 890, as will be referred to later, the order in which the stop position estimate is updated is reversed, the edge number in the memory 6 is decremented by one (1). For example, when the edge number E1 is in the memory 6, it is returned back to the edge number E20.

After completion of such updating, the routine proceeds to step 850 wherein the orientation of the edge of one of the intake and exhaust cam angle signals (i.e., the direction of changing of the edge), as recorded in step 700 of FIG. 7 one program cycle earlier, is compared with that recorded in this program cycle to determine whether the engine 3 is rotating in the forward direction or the reverse direction. Specifically, as can be seen from FIG. 2, when the engine 3 is rotating in the forward direction, a sequence of edges of the intake and exhaust cam angle signals to be inputted to the microcomputer 5 bear a fixed relation between the order of appearance of the edges and the orientation thereof. Therefore, when the engine 3 is reversed in rotation, the relation will be changed. The determination of the direction of rotation of the engine 3 (i.e., the crankshaft 33) may be achieved by monitoring the relation.

However, in a case where the position of the crankshaft 33 fallen between the edge numbers E2 and E6 of FIG. 2 during the forward rotation of the engine 3, and the edge number E5 is stored in the memory 6 as the stop position estimate, when the leading edge of the intake cam angle signal is inputted to the microcomputer 5 to initiate the program of FIG. 7, it will result in a difficulty in finding the direction of rotation of the engine 3 only using the edges consecutively used in initiating the program of FIG. 7. In order to eliminate this problem, the routine proceeds to step 860 wherein the direction of rotation of the engine 3 has been found or not.

If a YES answer is obtained meaning that the direction of rotation of the engine 3 has already been found, then the routine proceeds to step 870 wherein the result of determination in step 850 is analyzed to determine whether the engine 3 has been reversed in rotation or not. If a YES answer is obtained, then the routine proceeds to step 880 wherein the stop position estimate stored in the memory 6 is corrected in accordance with the direction of rotation of the engine 3. The routine proceeds to step 890 wherein the order in which the stop position estimate is updated is reversed and then terminates. If a NO answer is obtained in step 870 meaning that the direction of rotation of the engine 3 has not been reversed, then the routine terminates.

If a NO answer is obtained in step 860 meaning that the direction of rotation of the engine 3 has not yet been found, then the routine proceeds to step 895 wherein an estimate of the stop position of the crankshaft 33 on the condition that the engine 3 is rotating in a direction opposite that in which the engine 3 may be viewed as rotating currently is also entered as a stop position candidate in the memory 6 in addition to the stop position estimate updated in step 840. For instance, in the case where the engine 3 is determined to be rotating in the forward direction, and the stop position estimate is updated in step 840, that is, when the stop position estimate is incremented by one (1), the engine 3 is determined as being rotating in the reverse direction, and the stop position estimate is decremented by one (1) and added as the stop position candidate to the memory 6 in step 895. After step 895, the routine terminates.

FIG. 9 shows a cylinder identification program to be executed in step 740 of FIG. 7 when the position of the crankshaft 33 is not yet fixed at the start of the engine 3.

First, in step 905, it is determined whether the crank angle signal, the intake cam angle signal, and the exhaust cam angle signal are all being inputted to the microcomputer 5 correctly or not. If a NO answer is obtained meaning that at least one of the crank angle signal, the intake cam angle signal, and the exhaust cam angle signal is an erroneous one, then the routine terminates. Alternatively, if a YES answer is obtained meaning that all the crank angle signal, the intake cam angle signal, and the exhaust cam angle signal inputted to the microcomputer 5 are correct ones, then the routine proceeds to step 910 wherein the type and orientation of the edge of one of the intake and exhaust cam angle signals, as stored in step 700 of FIG. 7, are analyzed to determine whether the edge of one of the intake and exhaust cam angle signals used to initiate this program is a leading edge of the intake cam angle signal or not.

If a YES answer is obtained meaning that the leading edge of the intake cam angle signal has been used as a trigger for initiating this program, then the routine proceeds to step 915 wherein it is determined whether the starter mask time expires or not. If a YES answer is obtained, then the routine proceeds to step 920 wherein a counting function (not shown) is commenced to count the number of leading edges (or trailing edge) of the crank angle signal. The routine then terminates.

If a NO answer is obtained in step 910 meaning that the leading edge of the intake cam angle signal has not been used to initiate this program, then the routine proceeds to step 930 wherein it is determined whether the edge of one of the intake and exhaust cam angle signals used to initiate this program is a trailing edge of the intake cam angle signal or not. If a NO answer is obtained, then the routine terminates. Alternatively, if a YES answer is obtained, then the routine proceeds to step 935 wherein the counting function has been initiated in step 920 to count the number of the leading edges of the crank angle signal or not.

If a NO answer is obtained meaning that the edges of the crank angle signal is not yet started to be counted, then the routine terminates. Alternatively, if a YES answer is obtained, then the routine proceeds to step 940 wherein the number of the leading edges (or trailing edges) of the crank angle signal, as counted in step 920, is analyzed to determine the position of the engine 3 (i.e., the crankshaft 33). Specifically, the intake camshaft position sensor 39 is, as described above, designed to produce as many pulses as the cylinders of the engine 3 during one cycle of the engine 3 which have widths (i.e., the intervals between the leading and trailing edges) different from each other and to develop the trailing edge of each of the pulse at 33° BTDC of one of the first to fifth cylinders of the engine 3. The determination of the position of the crankshaft 33 is, therefore, achieved in step 940 by reading the number of the leading edges of the crank angle signal, as counted in step 920, to determine the interval between the leading and trailing edges which have appeared last.

After step 940, the routine proceeds to step 950 wherein the value indicating the position of the crankshaft 33, as determined in step 940, is entered in the crank counter. The microcomputer 5 reads the count out of the crank counter to identify the cylinders of the engine 3.

Figure 10:
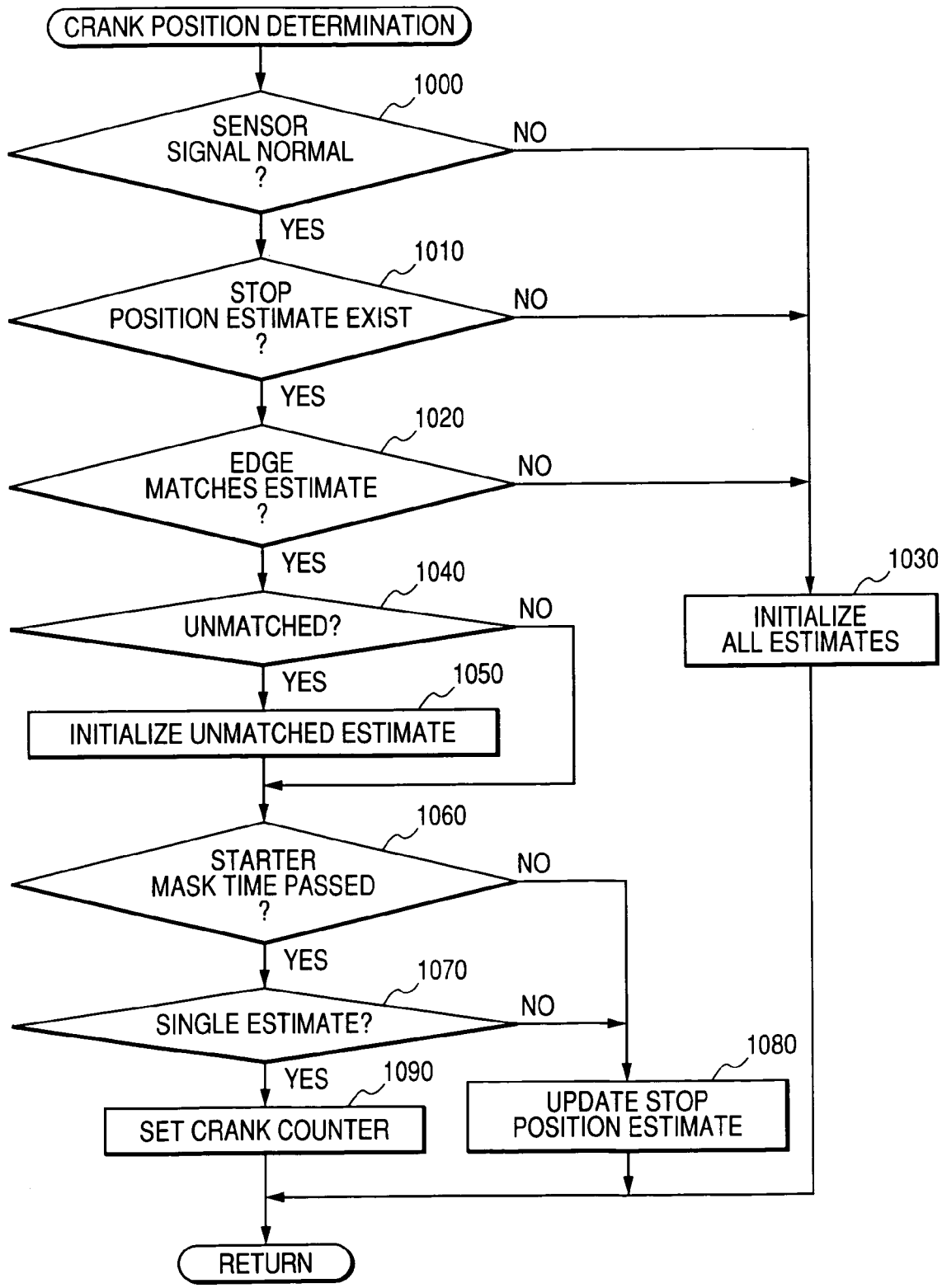
FIG. 10 is a flowchart of a sub-program to be executed in the program of FIG. 7 to determine the position of a crankshaft of an engine at a start of the engine.

FIG. 10 shows a crankshaft position determining program to be executed in step 760 of FIG. 7 in the event that the position of the crankshaft 33 has not been specified at the start of the engine 3.

First, in step 1000, it is determined whether the crank angle signal, the intake cam angle signal, and the exhaust cam angle signal are all being inputted to the microcomputer 5 correctly or not. If a NO answer is obtained meaning that at least one of the crank angle signal, the intake cam angle signal, and the exhaust cam angle signal is an erroneous one, then the routine proceeds to step 1030. Alternatively, if a YES answer is obtained meaning that all the crank angle signal, the intake cam angle signal, and the exhaust cam angle signal inputted to the microcomputer 5 are correct ones, then the routine proceeds to step 1010 wherein it is determined whether the stop position estimate is retained in the memory 6 or not.

If a NO answer is obtained in step 1010 meaning that there is no stop position estimate in the memory 6, then the routine proceeds to step 1030. Alternatively, if a YES answer is obtained, then the routine proceeds to step 1020 wherein the type and orientation of the edge of one of the intake and exhaust cam angle signals used to initiate this program cycle are analyzed to determine whether the edge number thereof matches the stop position estimate in the memory 6 or not. Specifically, the stop position estimate is, as described already, given by one of the edge numbers E1 to E20 assigned to the edge having appeared last at one of the intake and exhaust cam angle signals at a stop of the engine 3 rotating in the forward direction and may be used to determine the type and orientation of one of the intake and exhaust cam angle signal which will be inputted to the microcomputer 5 at a subsequent start of the engine 3. Therefore, in step 1020, the determination of whether the edge number of the edge having inputted in this program cycle matches the stop position estimate in the memory 6 or not is made to determine whether the stop position estimate in the memory 6 indicates an actual position of the engine 3 (i.e., the crankshaft 33) or not. If there are a plurality of stop position estimates in the memory 6, it is determined in step 1020 whether the edge number matches at least one of the stop position estimates or not.

If a NO answer is obtained in step 1020 meaning that the edge number of the edge having appeared at one of the intake and exhaust cam angle signals in this program cycle does not match the stop position estimate(s), that is, that the position of the engine 3, as represented by the stop position estimate, disagrees with an actual position of the engine 3, then the routine proceeds to step 1030. Alternatively, if a YES answer is obtained, then the routine proceeds to step 1040 wherein it is determined whether there is the stop position estimate(s) in the memory 6 which disagrees with the edge number of the edge having appeared in this program cycle or not.

In step 1030, all the stop position estimates in the memory 6 are erased. The routine then terminates.

If a YES answer is obtained in step 1040 meaning that there is the unmatched stop position estimate(s), then the routine proceeds to step 1050 wherein the unmatched stop position estimate(s) is cleared from the memory 6 and proceeds to step 1060. Alternatively, if a NO answer is obtained in step 1040, then the routine proceeds to step 1060 wherein it is determined whether the starter mask time expires or not. If a YES answer is obtained, then the routine proceeds to step 1070 wherein the number of the stop position estimates retained in the memory 6 is one (1) or not.

If a NO answer is obtained in step 1070 meaning that there are a plurality of the stop position estimates in the memory 6 or in step 1060 meaning that the starter mask time has not yet passed, then the routine proceeds to step 1080 wherein the stop position estimates in the memory 6 are updated in a direction when the engine 3 is determined as rotating in the forward direction, that is, they are incremented by one (1). The routine then terminates.

If a YES answer is obtained in step 1070 meaning that there is only the one stop position estimate in the memory 6, then the routine proceeds to step 1090 wherein the value indicating the current position of the crankshaft 33 is determined based on the stop position estimate retained in the memory 6 and entered in the crank counter. If the edge number E1 is retained in the memory 6 as the stop position estimate, the this cycle of the program is viewed as having been initiated upon input of the edge of the edge number E2 following the edge number E1 into the microcomputer 5. The value indicating the position of the crankshaft 33, as represented by the edge number E2, is entered in the crank counter. Once the crank counter is set in step 1090, the routine skips step 1090 and step 740 in subsequent program cycles.

Figure 11:
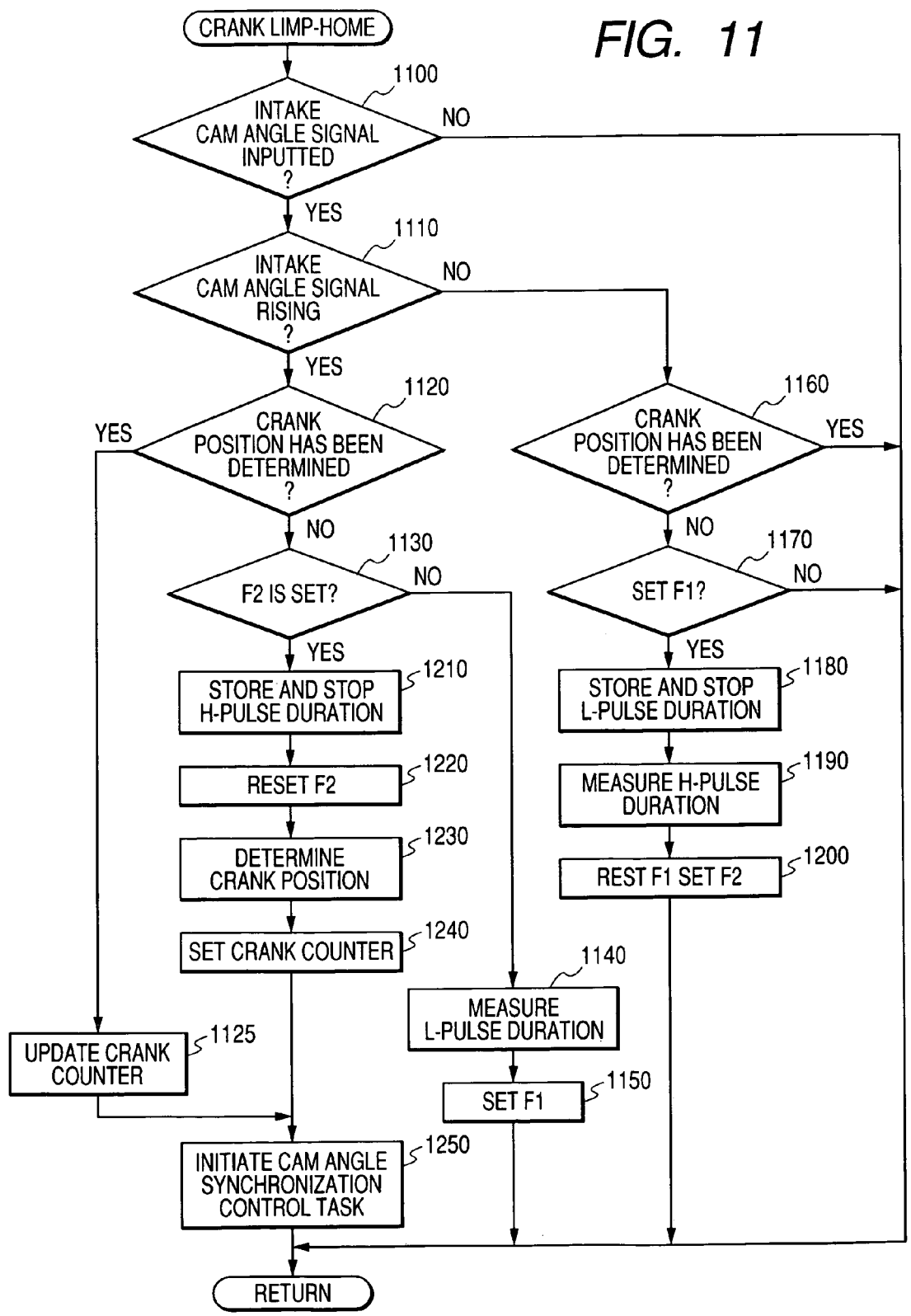
FIG. 11 is a flowchart of a sub-program to be executed in the program of FIG. 7 upon input of error sensor signal to an engine control system.

FIG. 11 shows a crank limp-home program to be executed in step 780 of FIG. 7 when the crankshaft position sensor 35 is determined to have failed, thus resulting in input of an error signal to the microcomputer 5.

First, in step 1100, it is determined whether the initiation of this cycle of the program of FIG. 7 is achieved by input of the edge of the intake cam angle signal or not. If a NO answer is obtained meaning that it is achieved by input of the edge of the exhaust cam angle signal, then the routine terminates. Alternatively, if a YES answer is obtained, then the routine proceeds to step 1110 wherein the edge of the intake cam angle signal inputted to the microcomputer 5 is a trailing one or not. If a YES answer is obtained meaning that the trailing edge of the intake cam angle signal has been inputted, then the routine proceeds to step 1120. Alternatively, if a NO answer is obtained, then the routine proceeds to step 1160.

In step 1120, it is determined whether the position of the crankshaft 33 has been specified or not. If a YES answer is obtained, then the routine proceeds to step 1125 wherein the count of the crank counter is updated and to step 1250. Alternatively, if a NO answer is obtained, then the routine proceeds to step 1130 wherein it is determined whether an H-pulse duration counting flag F2 is one (1) or not. The H-pulse counting flag F2 and an L-pulse duration counting flag F1, as will be referred to later, are to be reset to zero (0) by an initialization task performed at the start of the engine control system 1.

If a NO answer is obtained in step 1130 meaning that the H-pulse duration counting flag F2 is zero (0), then the routine proceeds to step 1140 wherein a counting function is initiated to count an L-pulse duration that is the elapsed time since input of the trailing edge of the intake cam angle signal. The L-pulse duration is stored in the microcomputer 5. The routine then proceeds to step 1150 wherein the L-pulse duration counting flag F1 is set to one (1) and terminates.

In step 1160 following step 1110 when the leading edge of the intake cam angle signal is determined to have been inputted in this program cycle, it is determined, like step 1120, whether the position of the crankshaft 33 has already been found or not. If a YES answer is obtained, then the routine terminates. Alternatively, a NO answer is obtained, then the routine proceeds to step 1170 wherein the L-pulse counting flag F1 is one (1) or not.

If a NO answer is obtained is step 1170, then the routine terminates. Alternatively, if a YES answer is obtained, then the routine proceeds to step 1180 wherein the L-pulse duration, as started to be counted in step 1140, is read and stored, and such counting is stopped. The L-pulse duration is the length of time the intake cam angle signal is kept at the low level.

After step 1180, the routine proceeds to step 1190 wherein a counting function is initiated to count an H-pulse duration that is the elapsed time since input the leading edge of the intake cam angle signal. The H-pulse duration is stored in the microcomputer 5. The routine then proceeds to step 1200 wherein the L-pulse duration counting flag F1 is reset to zero (0), and the H-pulse duration counting flag F2 is set to one (1). Afterwards, the routine terminates.

If a YES answer is obtained in step 1130 meaning that the H-pulse duration counting flag F2 is one (1), then the routine proceeds to step 1210 wherein the H-pulse duration, as started to be counted in step 1190, is read and stored, and such counting is stopped. The H-pulse duration is the length of time the intake cam angle signal is kept at the high level.

After step 1210, the routine proceeds to step 1220 wherein the H-pulse duration counting flag F2 is reset to zero (0). The routine proceeds to step 1230 wherein a ratio of the L-pulse duration, as derived in step 1180, to the H-pulse duration, as derived in step 1210, is calculated to determine the position of the crankshaft 33 upon the appearance of the trailing edge of the intake cam angle signal.

Specifically, using the two flags F1 and F2 to be reset upon the start of the engine control system 1, the L-pulse duration that is the time interval between appearance of a trailing edge of the intake cam angle signal and appearance of a subsequent leading edge thereof is measured through steps 1140 and 1180, after which the H-pulse duration that is the time interval until appearance of a subsequent trailing edge of the intake cam angle signal is measured. Upon completion of counting of the H-pulse duration in step 1210, the measurement of the last cycle in which the intake cam angle signal changes in level (i.e., the sum of the L- and H-pulse durations) is completed.

The intake camshaft position sensor 39 is, as described above, designed to produce as many pulses as the cylinders of the engine 3 during one cycle of the engine 3 which have the interval (i.e., the H-pulse duration) between the leading and trailing edges and the interval (i.e., the L-pulse duration) between the trailing and leading edges which are different from each other and to develop the trailing edge of each of the pulse at 33° BTDC of one of the first to fifth cylinders of the engine 3. This enables the ratio of the L-pulse duration to the H-pulse duration within one cycle between the last appearance of the trailing edge of the intake cam angle signal and the preceding appearance thereof to be used to specify the position of the crankshaft 33.

Figure 12:
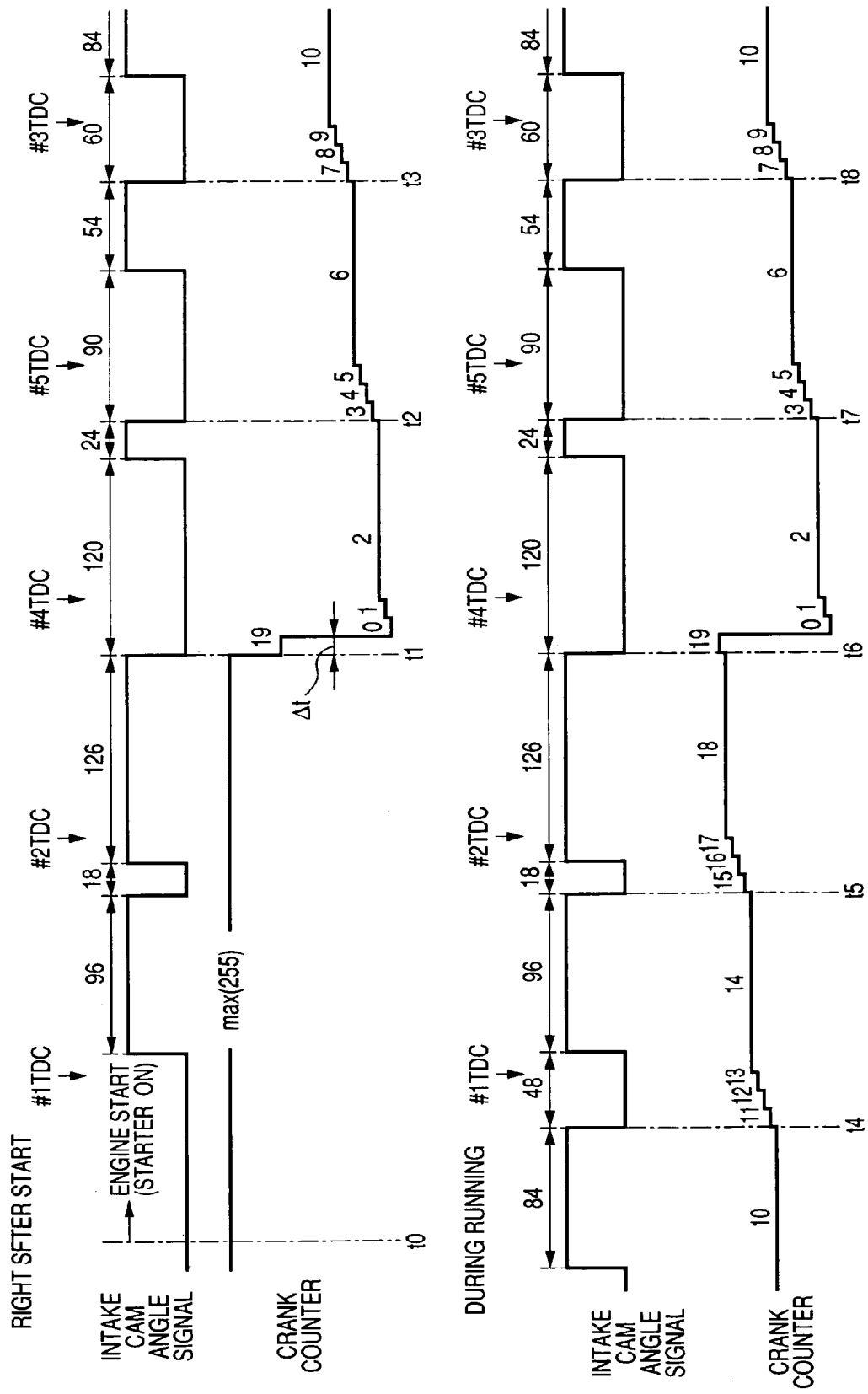
FIG. 12 is a timechart which demonstrates an output of a intake camshaft position sensor and a count of a crank counter just after a start or during running of an engine.

For instance, as demonstrated in FIG. 12, when the engine 3 is started at time t0 so that the intake cam angle signal is inputted to the microcomputer 5, during an interval between two consecutive trailing edges of a pulse of the intake cam angle signal, the L-pulse duration in which the intake cam angle signal is kept low and the H-pulse duration in which the intake cam angle signal is kept high are measured in sequence. At time t1 when such measurement is completed, the ratio of the L-pulse duration to the H-pulse duration (i.e., 18:126) is calculated and used to determine the position of the crankshaft 33. Specifically, in the illustrated case, at a time when the L-to-H pulse duration ratio is found to be 18:126, the crankshaft 33 is determined to be at 30° BTDC of the fourth cylinder #4.

After completion of the determination of the position of the crankshaft 33 in step 1230, the routine proceeds to step 1240 wherein the crank counter is set to the value as indicating the determined position of the crankshaft 33. Upon completion of step 1240, it is determined that the position of the crankshaft 33 has been found. Afterwards, step 1250 is executed every falling of a pulse of the intake cam angle signal.

In step 1250, the crank angle synchronization control task is initiated to update the count of the crank counter, as demonstrated in FIG. 12, so that upon a subsequent input of the trailing edge of the intake cam angle signal, the count may agree with a value corresponding to that trailing edge, and to control the engine 3 in synchronization with the cycle (144° CA) between two consecutive trailing edges of pulses of the intake cam angle signal. In the case illustrated in FIG. 12, before the position of the crankshaft 33 is specified in step 1230, the count of the crank counter is set to 255 which is out of a counting range (0 to 19) in order to avoid a control error. At time t1 when the trailing edge of the intake cam angle signal is inputted, the count of the crank counter is first set to 19 and then updated to 0, to 1, to 2 . . . . As can be seen from the drawing, the crank counter is controlled so that the count is updated four times between two consecutive inputs of the trailing edge of the intake cam angle signal. For instance, after time t1, the count is incremented by one (1) first three times at a time interval $\Delta t$ (e.g., 1 msec.), and at the last time at an increased time interval so that the count is incremented four times between tow consecutive inputs of the trailing edge of the intake crank angle signal. Note that the count value is, as already described, illustrated in FIG. 12 as having a resolution of 36° CA and lapping around 0 to 119, but in practice, has a resolution of 6° and laps around 0 to 119.

After step 1250, the routine then terminates to complete the crank limp home task.

As apparent from the above discussion, the engine control system 1 of this embodiment is designed to perform the operation in step 760 to determine the position of the crankshaft 33 using the 6 stop position estimate and the intake and exhaust cam angle signals or the operation in step 740 to determine the position of the crankshaft 33 using the intake and exhaust cam angle signals every input of the edge of one of the intake and exhaust cam angle signals, thereby ensuring the stability in finding the position of the crankshaft 33. This permits the control of the engine 3 to be initiated after start thereof using the position of the crankshaft 33, as determined in step 740, if there was a difficulty in estimating the stop position of the crankshaft 33 in step 795 upon stop of the engine 3.

The determination of the position of the crankshaft 33 in step 760 or 740 at the start of the engine 3 is accomplished using the intake and exhaust cam angle signal or the intake cam angle signal or the crank angle signal. The failure in operation of the intake and exhaust camshaft position sensors 39 and 43, thus, results in a difficulty in determining the position of the crankshaft 33 at the start of the engine 3. The microcomputer 5, however, works to perform the program of FIG. 6 using the non-pulse portion K of the crank angle signal every input of the trailing edge of the pulse of the crank angle signal to determine the position of the crankshaft 33. If one of the intake and exhaust camshaft position sensors 39 and 43 has failed in operation, the other of them is used to determine the position of the crankshaft 33. If both the intake and exhaust camshaft position sensors 39 and 43 have failed, a change in the pulse width of the crank angle signal is used to determine the position of the crankshaft 33. This permits the control of the engine 3 to be initiated if a difficulty is encountered in determining the position of the crankshaft 33 in either of step 760 or 740, thereby improving the reliability of the engine control system 1.

If the crankshaft position sensor 35 has failed in operation, it will result in a difficulty in executing the crank signal-interruption program of FIG. 6 to determine the position of the crankshaft 33 at the start of the engine 3 and update the count of the crank counter for indicating the position of the crankshaft 33 after the start of the engine 3. In order to avoid this drawback, the microcomputer 5 performs the crank limp-home task, as illustrated in FIG. 11, and enters the limp-home mode to determine the position of the crankshaft 33 and update the count of the crank counter using inputs from the intake camshaft position sensor 39, thereby improving the reliability of the engine control system 1.

The crank limp-home task may alternatively be performed using outputs of the exhaust camshaft position sensor 43.

The crank limp-home tasks may also be performed using outputs from both the intake and exhaust camshaft position sensors 39 and 43. In this case, if one of the intake and exhaust camshaft position sensors 39 and 43 has failed in operation, the output of the other of them is used to determine the position of the crankshaft 33 and update the count of the crank counter.

The estimation of the stop position of the crankshaft 33 using the edges of pulses of the intake and exhaust cam angle signals requires increasing the edges and decreasing the edge-to-edge intervals with an increase in number of the cylinders of the engine 3. This will result in the complexity of shape of the intake and exhaust camshaft position sensors 39 and 43 and an increase in accuracy required to install the sensors 39 and 43 on the intake and exhaust camshafts 37 and 41, which will lead to an increase in total production cost of the engine control system 1. This problem may be eliminated by estimating the stop position of the crankshaft 33 roughly using the edges of the intake cam angle signal at the stop of the engine 3, after which the stop position of the crankshaft 33 is specified by counting the edges of the crank angle signal.

The determination of the stop position of the crankshaft 33 is achieved through steps 850 to 895 of FIG. 8 by monitoring a change in orientation of the edge of one of the cam angle signals to find the direction of rotation of the engine 3 and correcting the stop position estimate of the crankshaft 33 if the engine 3 is determined to be rotating in the reverse direction. If there is a difficulty in determining the direction of rotation of the engine 3 accurately, candidates of the stop position estimate are additionally calculated based on an estimated direction of rotation of the engine 3. These operations may be eliminated by designing the intake and exhaust camshaft position sensors 39 and 43 so as not to produce the edges of pulses of the intake and exhaust cam angle signals when the engine 3 is reversed in rotation just before stop thereof.

Specifically, the fact that the edge of either of the intake or exhaust cam angle signal is inputted to the microcomputer 5 when the engine 3 has reversed in rotation without the pistons exceeding the TDCs (Top Dead Centers)thereof is because the intake and exhaust camshaft position sensors 39 and 43 are each designed to produce the edges of pulses immediately before the pistons of the engine 3 reach the TDCs, respectively. Steps 850 to 895 may, therefore, be omitted by designing the intake and exhaust camshaft position sensors 39 and 43 so as to output the edges when the pistons of the engine 3 reach or pass the TDCs thereof.

FIGS. 13 to 17 show operations of the microcomputer 5 according to the fourth embodiment of the invention. The same step reference numbers as employed in the first, second, and third embodiments will refer to substantially the same operations.

Figure 13:
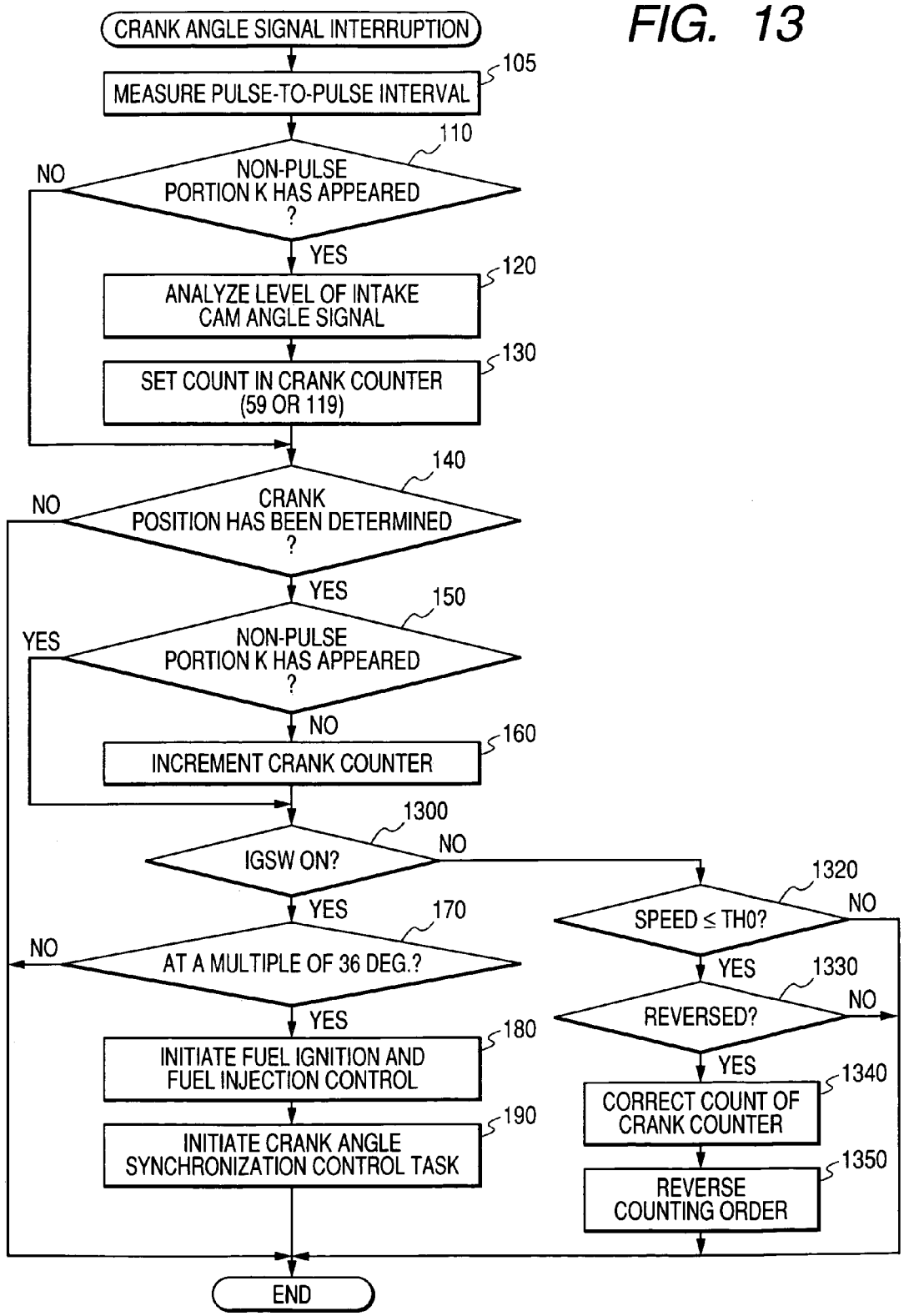
FIG. 13 is a flowchart of a program to be executed by an engine control system according to the fourth embodiment of the invention every input of a signal outputted from a crankshaft position sensor.

FIG. 13 is a flowchart of a crank angle signal-interruption program to be initiated, like the one of FIG. 3, cyclically every input of the trailing edge of a pulse of the crank angle signal to determine the position of the crankshaft 33. The program is, however, inhibited from being executed for the starter mask time which is, as described above, a given period of time since the engine is cranked by the starter upon turning on of the starter switch and during which great noises arising from the operation of the starter would be added to the crank angle signal.

Steps 105 to 150 are identical in operation with ones of FIG. 3, and explanation thereof in detail will be omitted here.

If a NO answer is obtained in step 150 meaning that the non-pulse portion K has not yet appeared at the crank angle signal, then the routine proceeds to step 160 wherein the count of the crank counter is incremented by one (1). Alternatively, when the order in which the trailing edges of the crank angle signal are counted has been reversed in step 1350, as will be described later, the count of the crank counter is decremented by one (1).

After step 160 or if a YES answer is obtained in step 150, the routine proceeds to step 1300 wherein it is determined whether the ignition switch 45 is in the on-state or not, that is, whether the engine 3 is running or not. If a YES answer is obtained, then the routine proceeds to step 170 wherein an actual position of the crankshaft 33 is at a multiple of 36° CA from 6° BTDC of the fourth cylinder #4 or not, that is, whether the count of the crank counter is a multiple of 6 (i.e., 0, 6, 12, . . . , 108, or 114) or not. If a NO answer is obtained, then the routine terminates. Alternatively, if a YES answer is obtained, then the routine proceeds to step 180 wherein a control task is launched to control ignition and fuel injection timings for each of the cylinders of the engine 3. The routine proceeds to step 190 wherein the crank angle synchronization control task, as described in the third embodiment, is executed which is to be initiated each 36° CA and then terminates. Specifically, in steps 180 and 190, the microcomputer 5 calculates the ignition timing at which the spark plug of each of the cylinders of the engine 3 is energized, the quantity of fuel to be injected into each of the cylinders of the engine 3, and the injection timing at which the fuel is to be injected into each of the cylinders of the engine 3 and also sets a timer for initiating the ignition and fuel injection in the engine 3.

If a NO answer is obtained in step 1300 meaning that the ignition switch 45 is in the off-state, then the routine proceeds to step 1320 wherein it is determined whether the speed of the engine 3 is less than or equal to a preselected value TH0 or not. The value TH0 is a limit at which the engine 3 may be viewed as going to stop, that is, the engine 3 is in a transition from a running state to a stopped state. The value TH0 is for example, 500 rpm slightly lower than a set idle speed of the engine 3. The speed of the engine 3 is calculated as a function of the pulse interval of the crank angle signal as derived and stored in step 105.

If a NO answer is obtained in step 1320 meaning that the speed of the engine 3 is higher than the value TH0, then the routine terminates. Alternatively, if a YES answer is obtained, then the routine proceeds to step 1330 wherein a history on a change in pulse interval of the crank angel interval, as derived in step 105, is analyzed to determine whether the engine 3 has been reversed in rotation or not. When going to stop, the engine 3 may be reversed in rotation without the pistons exceeding the TDCs thereof. The determination of whether the engine 3 has reversed or not is, therefore, made in step 1330 by analyzing the history on a change in the pulse interval of the crank angle signal, as derived from step 105.

If a NO answer is obtained in step 1330, then the routine terminates. Alternatively, if a YES answer is obtained, then the routine proceeds to step 1340 wherein the count of the crank counter is corrected to agree with an actual position of the crankshaft 33 having reversed in rotation. The routine proceeds to step 1350 wherein the order in which the count of the crank counter is updated or changed in step 160 is reversed. The routine then terminates.

Figure 14:
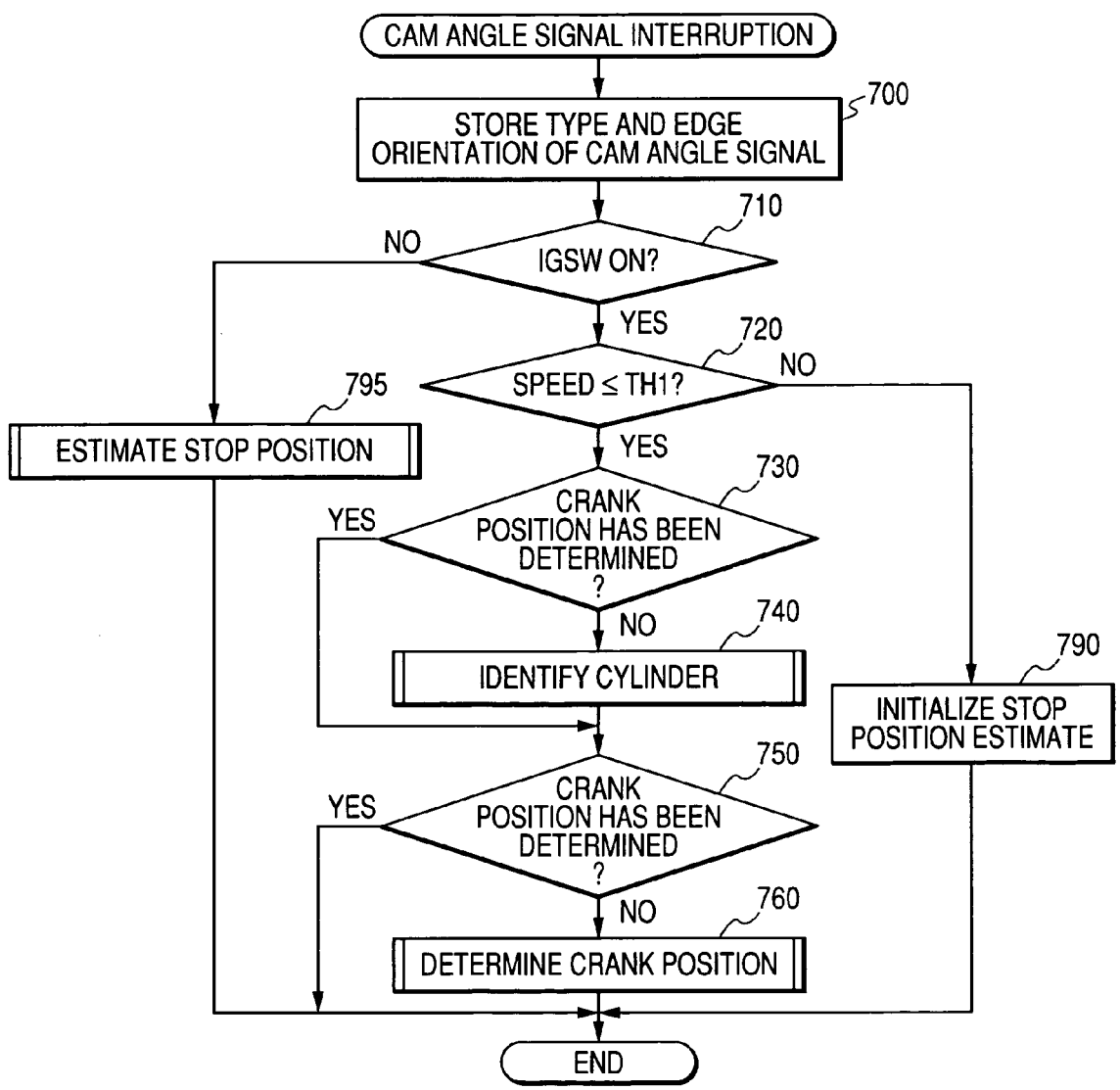
FIG. 14 is a flowchart of a program to be executed by an engine control system according to the fourth embodiment every input of a signal outputted form one of an intake and an exhaust camshaft position sensor.

FIG. 14 shows a cam angle signal-interruption program to be initiated every input of the edge of a pulse appearing at either of the intake or exhaust cam angle signal to the microcomputer 5. The program is identical with the one of FIG. 7 from which steps 770 and 780 are omitted and explanation thereof in detail will be omitted here.

Figure 15:
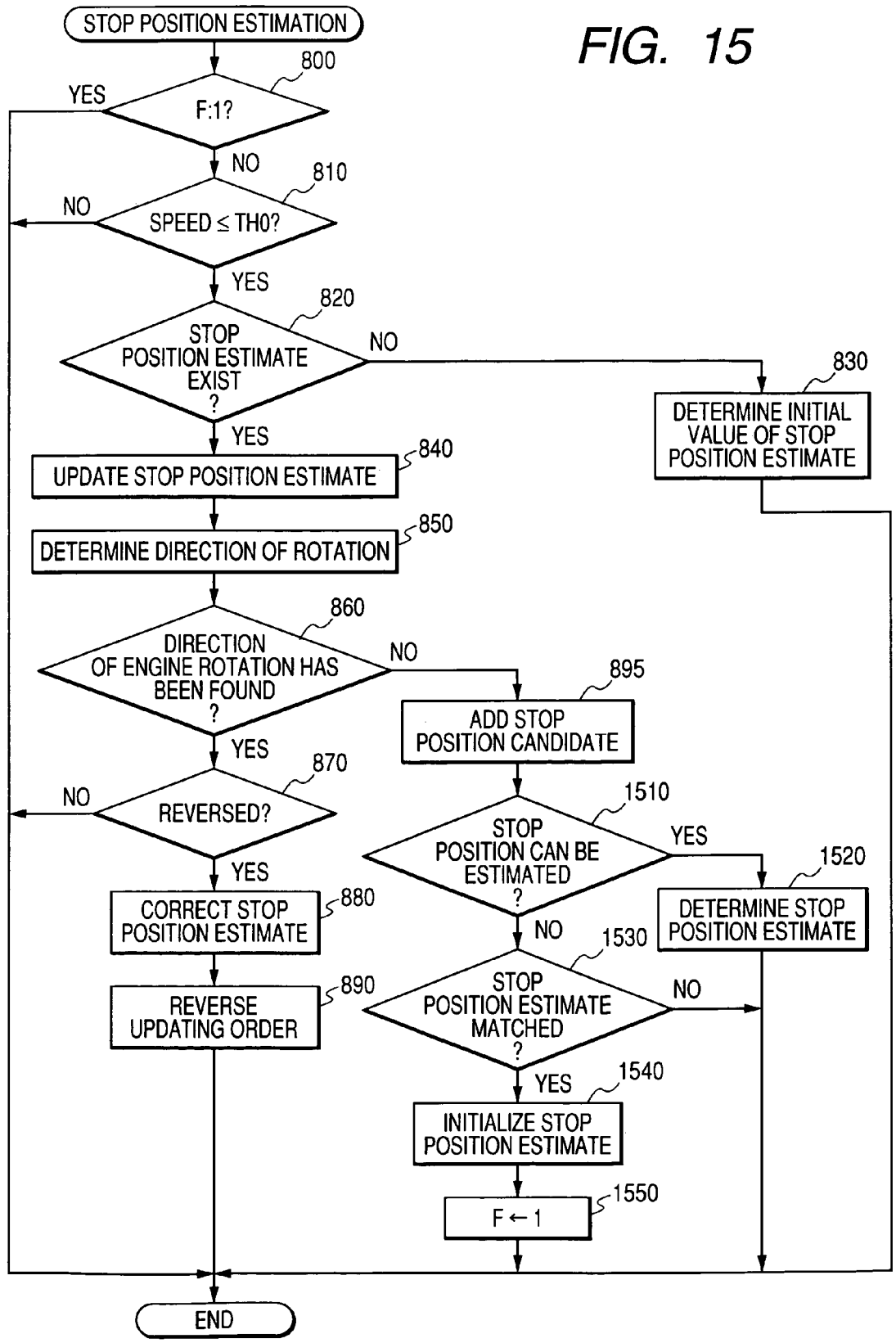
FIG. 15 is a flowchart of a sub-program to be executed in the program of FIG. 14 to estimate the stop position of a crankshaft of an engine.

FIG. 15 shows an operation to be executed in step 795 of FIG. 14 to estimate the stop position of the crankshaft 33.

Steps 800 to 830 are identical with the ones of FIG. 8 in the third embodiment, and explanation thereof in detail will be omitted here. If, however, a YES answer is obtained instep 810, the routine proceeds directly to step 820.

If a YES answer is obtained in step 820 meaning that the stop position estimate is already recorded in the memory 6, then the routine proceeds to step 840, to step 850, and to step 860. These steps are identical with the ones of FIG. 8, and explanation thereof in detail will be omitted here.

If a NO answer is obtained in step 860 meaning that the direction of rotation of the engine 3 is not yet found, then the routine proceeds to step 895. Alternatively, if a YES answer is obtained, then the routine proceeds to step 870, to step 880, and to step 890. These steps are identical with the ones of FIG. 8, and explanation thereof in detail will be omitted here.

In step 895, an estimate of the stop position of the crankshaft 33 on the condition that the engine 3 is rotating in a direction opposite that in which the engine 3 may be viewed as rotating currently is also entered as a stop position candidate in the memory 6 in addition to the stop position estimate updated in step 840. For instance, in the case where the engine 3 is determined to be rotating in the forward direction, and the stop position estimate is updated in step 840, that is, when the stop position estimate is incremented by one (1), the engine 3 is determined as being rotating in the reverse direction, and the stop position estimate is decremented by one (1) and added as the stop position candidate to the memory 6 in step 895.

After step 895, the routine proceeds to step 1510 wherein it is determined whether it is possible to estimate the stop position of the crankshaft 33 using the count of the crank counter or not. Specifically, in the program of FIG. 13, at the start of the engine 3, it is determined in step 1330 whether the engine 3 has been reversed in rotation or not. In step 1340, the count of the crank counter is corrected or updated based on the result of determination in step 1330. Therefore, in step 1510, the determination of the direction of rotation of the engine 3 is made every input of the trailing edge of a pulse of the crank angle signal to monitor the operations in steps 1330 and 1340 to determine whether the count of the crank counter has been updated correctly or not for determining whether it is possible to estimate the stop position of the crankshaft 33 or not.

If a YES answer is obtained in step 1510, then the routine proceeds to step 1520 wherein a single estimate of the stop position of the crankshaft 33 is determined using the count of the crank counter. The routine then terminates.

If a NO answer is obtained instep 1510, then the routine proceeds to step 1530 wherein it is determined whether a plurality of the stop position estimates retained in the memory 6 match values or not which are predetermined as being unsuitable for determining the position of the engine 3 (i.e., the crankshaft 33) at a subsequent start of the engine 3.

If a NO answer is obtained in step 1530 meaning that the stop position estimates in the memory 6 are allowed to be used in determining the position of the crankshaft 33 at the subsequent start of the engine 3, then the routine terminates. Alternatively, if a YES answer is obtained, then the routine proceeds to step 1540 wherein the crank counter is cleared to erase the stop position estimates. The routine proceeds to step 1550 wherein the estimation inhibit flag F is set to one (1) and then terminates.

The values used in step 1530 as being unsuitable for determining the position of the crankshaft 33 are values of the stop position estimates use of which in determining the position of the crankshaft 33 at the start of the engine 3 will result in a need for performing the operation in step 760 of FIG. 14 many times, which causes the time required for finding the position of the crankshaft 33 to be longer than that consumed in executing the crank signal-interruption program of FIG. 13 or the operation in step 740 of the cam angle signal-interruption program of FIG. 14 to fix the position of the crankshaft 33. Specifically, if there are a plurality of the stop position estimates in the memory 6, it will cause the microcomputer 5 to monitor, in step 760, the edge of a pulse of one of the intake and exhaust cam angle signals inputted from the intake and exhaust camshaft position sensor 39 and 43 at the start of the engine 3 and determine whether the edge matches one which is to be inputted to the microcomputer 5 if the engine 3 is started from the position, as indicated by one of the stop position estimates. The microcomputer 5 performs such an operation cyclically and ultimately determines the count of the crank counter, which is to be updated from the stop position of the crankshaft 33 represented by one of the stop position estimates, as indicating an actual position of the crankshaft 33 after the start of the engine 3. The number of such cyclic operations required to fix the position of the crankshaft 33 ultimately depends upon the number of the stop position estimates in the memory 6. A specific combination of the stop position estimates may result in a great increase in the cyclic operations in step 760 undesirably. In order to avoid this, the microcomputer 5 stores therein the stop position estimates of such a combination as the values used in step 1530 as being unsuitable for fixing the position of the crankshaft 33 and, when a plurality of the stop position estimates retained in the memory 6 match the values, inhibits the estimation of the stop position of the crankshaft 33.

Figure 16:
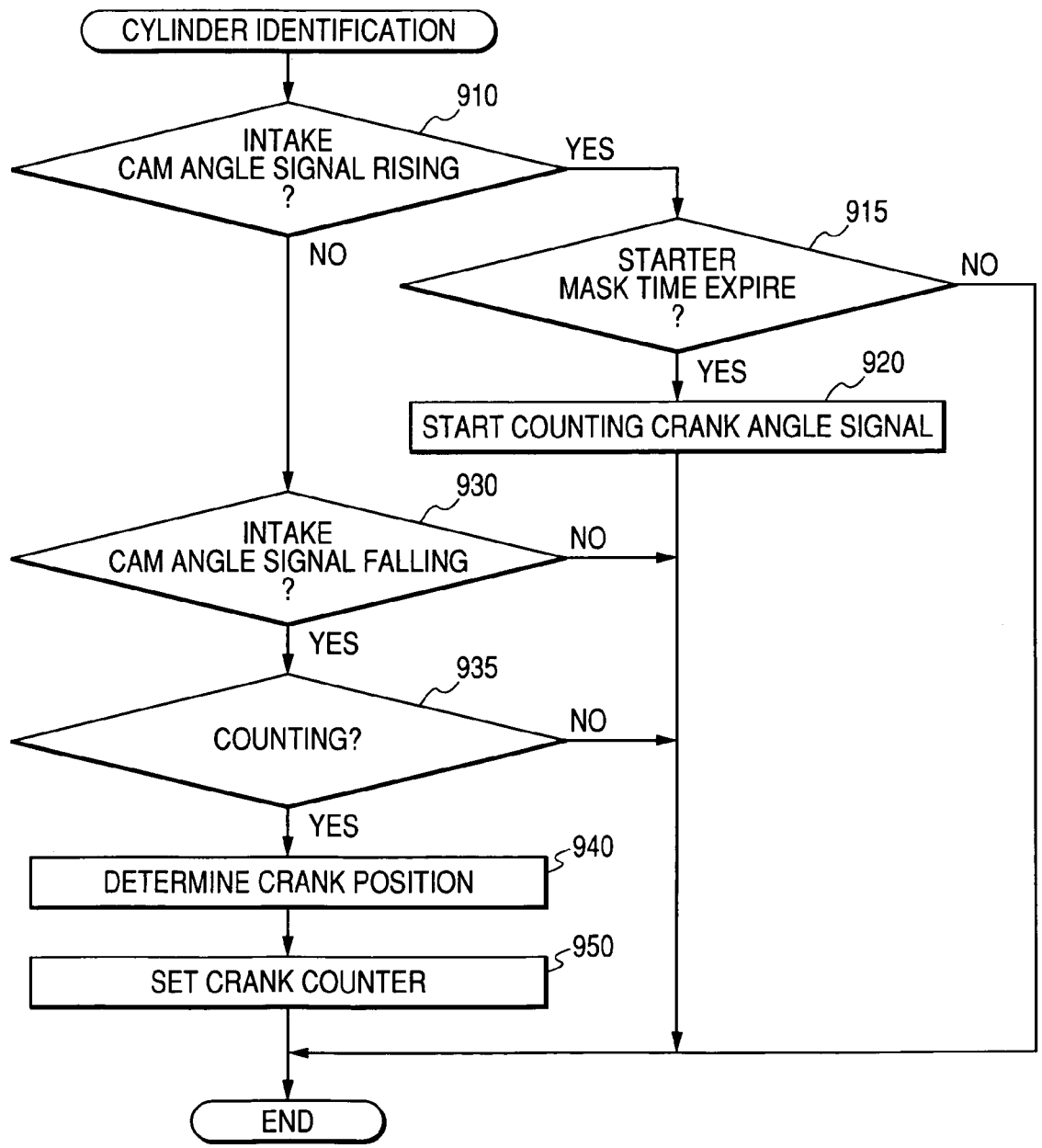
FIG. 16 is a flowchart of a sub-program to be executed in the program of FIG. 14 to identify cylinders of an engine.

FIG. 16 shows a cylinder identification program to be executed in step 740 of FIG. 14 when the position of the crankshaft 33 is not yet fixed at the start of the engine 3. The same step numbers as employed in FIG. 9 will refer to the same operations.

After entering the program, the routine proceeds to step 910 wherein the type and orientation of the edge of one of the intake and exhaust cam angle signals, as stored in step 700 of FIG. 14, are analyzed to determine whether the edge of one of the intake and exhaust cam angle signals used to initiate this program is a leading edge of the intake cam angle signal or not.

If a YES answer is obtained, then the routine proceeds to step 915. Steps 915 and 920 are the same as the ones of FIG. 9, and explanation thereof in detail will be omitted here. Alternatively, if a NO answer is obtained, then the routine proceeds to step 930 wherein it is determined whether the edge of one of the intake and exhaust cam angle signals used to initiate this program is a trailing edge of the intake cam angle signal or not. Following steps 935 to 950 are the same as the ones of FIG. 9, and explanation thereof in detail will be omitted here.

Figure 17:
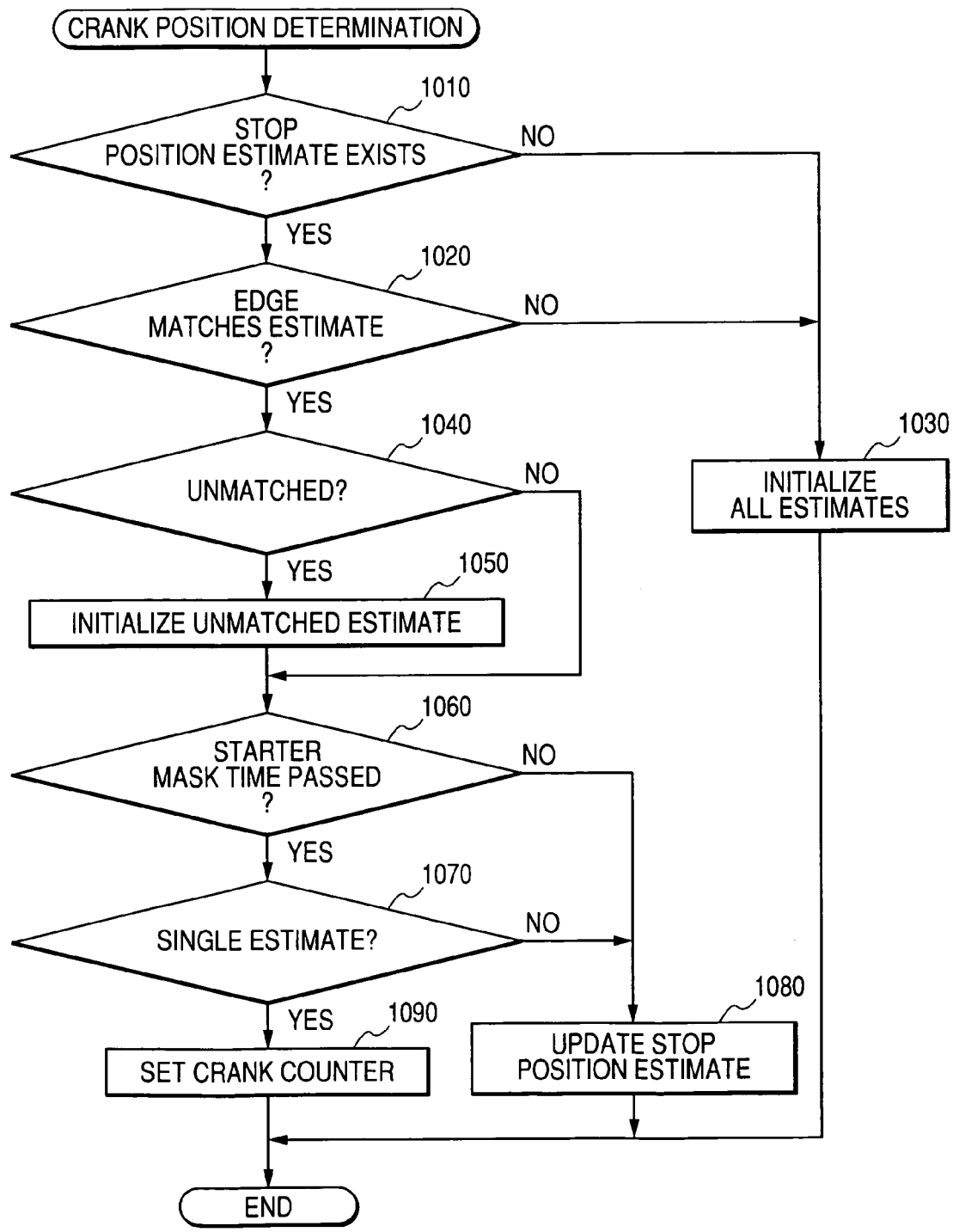
FIG. 17 is a flowchart of a sub-program to be executed in the program of FIG. 14 to determine the position of a crankshaft of an engine at a start of the engine.

FIG. 17 shows a crankshaft position determining program to be executed in step 760 of FIG. 14 in the event that the position of the crankshaft 33 is not specified at the start of the engine 3. The same step numbers as employed in FIG. 10 of the third embodiment will refer to the same operations.

After entering the program, the routine proceeds to step 1010 wherein it is determined whether the stop position estimate is retained in the memory 6 or not.

If a NO answer is obtained in step 1010 meaning that there is no stop position estimate in the memory 6, then the routine proceeds to step 1030. Alternatively, if a YES answer is obtained, then the routine proceeds to step 1020 wherein the type and orientation of the edge of one of the intake and exhaust cam angle signals used to initiate this program cycle are analyzed to determine whether the edge number thereof matches the stop position estimate in the memory 6 or not. Specifically, the stop position estimate is, as described already, given by one of the edge numbers E1 to E20 assigned to the edge having appeared last at one of the intake and exhaust cam angle signals at a stop of the engine 3 rotating in the forward direction and may be used to determine the type and orientation of one of the intake and exhaust cam angle signal which will be inputted to the microcomputer 5 at a subsequent start of the engine 3. Therefore, in step 1020, the determination of whether the edge number of the edge having inputted in this program cycle corresponds to the stop position estimate in the memory 6 or not is made to determine whether the stop position estimate in the memory 6 is allowed to be used to determine an actual position of the engine 3 (i.e., the crankshaft 33) or not. If there are a plurality of the stop position estimates in the memory 6, it is determined in step 1020 whether the edge number matches at least one of the stop position estimates or not.

If a NO answer is obtained in step 1020 meaning that the edge number of the edge having appeared at one of the intake and exhaust cam angle signals in this program cycle does not match the stop position estimate(s), that is, that the position of the engine 3, as represented by the stop position estimate, disagrees with an actual position of the engine 3, then the routine proceeds to step 1030.

Steps 1030 to 1090 are the same as the ones of FIG. 10, and explanation thereof in detail will be omitted here.

As apparent from the above discussion, the microcomputer 5 works to perform the count setting in step 130 of the crank signal-interruption program of FIG. 13, the cylinder identification in step 740 of the cam angle signal-interruption program of FIG. 14, or the crankshaft position determination in step 760 until the position of the crankshaft 33 is found, and the count of the crank counter is set at a start of the engine 3. When the count of the crank counter is set in either of those steps, the count of the crank counter is updated in the crank signal-interruption program of FIG. 13 to commence the control task for the engine 3. After the count of the crank counter is set, the microcomputer 5 inhibits the crankshaft position determination in step 760 and the cylinder identification in step 740 from being executed. This permits the microcomputer 5 to use the position of the crankshaft 33 which is derived earliest among the three types of crankshaft position determinations using the non-pulse portion K of the crank angle signal, a pattern of a change in level of the intake cam angle signal, and the stop position of the crankshaft 33 as estimated upon a stop of the engine 3, thereby accelerating the start of the control of the engine 3.

The engine 3 is sometimes reversed in rotation without the piston exceeding the TDCs thereof in the compression stroke. The stop position estimation in step 795 is made by finding the direction of rotation of the engine 3 (step 850) and estimating the stop position of the crankshaft 33 based on such a direction, thereby ensuring the accuracy in determining the stop position of the crankshaft 33.

The microcomputer 5, as apparent from the above, works to determine the direction of rotation of the engine 3 at the stop thereof not only in the stop position estimation in step 795 of the cam angle signal-interruption program, but also in step 1330 of the crank angle signal-interruption program of FIG. 13. If a difficulty is encountered in determining the direction of rotation of the engine using the intake or exhaust cam angle signals, the one as determined based on the crank angle signal is used for updating the count of the crank counter to estimate the stop position of the crankshaft 33, thus enhancing the accuracy in estimating the stop position of the crankshaft 33.

Further, if a difficulty is encountered in finding the direction of rotation of the engine 3 accurately not only in the stop position estimation of the cam angle signal-interruption program, but also in the crank angle signal-interruption program, the microcomputer 5 works to estimate the stop position of the engine 3 when rotating in the forward direction and that when rotating in the reverse direction in step 895 of FIG. 15. When the engine 3 has started, the microcomputer 5 finds the position of the crankshaft 33 using a plurality of the estimated stop positions in the crankshaft position determination of FIG. 17.

If there are a combination of the stop position estimates in the memory 6 which will cause the microcomputer 5 to take much time to find the position of the crankshaft 33 at the start of the engine 3, the microcomputer 5 is inhibited from executing the stop 5 position estimation in the program of FIG. 15 and the crankshaft position determination made in the program of FIG. 17 at the start of the engine 3, thereby eliminating execution of unwanted tasks in the microcomputer 5 to minimize operating loads thereon.

The microcomputer 5 is, as described above, designed to find the position of the crankshaft 33 at the start of the engine 3 through any of three tasks: the crankshaft position determination (step 760) and the cylinder identification (step 740) of the cam angle signal-interruption program and the count setting (step 130) in the crank angle signal interruption program and initiate the control of the engine 3 when the position of the crankshaft 33 is fixed earliest among the three tasks. The microcomputer 5 may, however, be designed to use either of the crankshaft position determination (step 760) or the count setting (step 130) or either of the crankshaft position determination (step 760) or the cylinder identification (step 740) to determine the position of the crankshaft 33 at the start thereof.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An engine control apparatus comprising:
   a crankshaft position determining circuit working to determine a crankshaft position that is a position of a crankshaft of an engine within one operating cycle of the engine in one of a first and a second mode of operation, in the first mode, the crankshaft position being determined using both a crank angle signal outputted from a crankshaft position sensor as a function of an angular position of the crankshaft and a cam angle signal outputted from a camshaft position sensor as a function of an angular position of a camshaft of the engine, in the second mode, the crankshaft position being determined only using the crank angle signal;
   a stop position estimating circuit working to determine a stop position estimate that is an estimate of a position at which the crankshaft is expected to stop when the engine stops using at least one of the crank angle signal and the cam angle signal; and
   an engine controller working to launch a given engine control task at a start of the engine based on the stop position estimate of the crankshaft, as determined by said stop position estimating circuit, when one of a first condition that indicates a possibility of performing the engine control task based on an erroneous value of the stop position estimate and a second condition that results in initiation of the engine control task based on an erroneous value of the stop position estimate is encountered, said engine controller inhibiting the engine control task from being launched based on the stop position estimate.

2. An engine control apparatus as set forth in claim 1, wherein said engine controller works to determine whether a third condition is met or not which indicates a possibility of an error in determining the stop position estimate through said stop position estimating circuit at a stop of the engine, when the third condition is met, said engine controller determining that the first condition is encountered to inhibit the engine control task from being launched, and wherein when the stop position estimate is not determined by said stop position estimating circuit, said engine controller initiates the engine control task following a determination of the crankshaft position made by said crankshaft position determining circuit.

3. An engine control apparatus as set forth in claim 2, wherein the third condition is a condition which causes the engine to undergo a given degree of resistance to rotation thereof.

4. An engine control apparatus as set forth in claim 3, wherein when a temperature of a cooling water of the engine is lower than a preselected value, said engine controller determines that the engine is undergoing the resistance to rotation thereof and that the third condition is met.

5. An engine control apparatus as set forth in claim 2, wherein the engine is installed in an automotive vehicle, and wherein the third condition is a condition in which a voltage developed by a storage battery installed in the vehicle is lower than a preselected level.

6. An engine control apparatus as set forth in claim 2, wherein the third condition is a condition which results in an error of input of at least one of the crank angle signal and the cam angle signal into said crankshaft position determining circuit.

7. An engine control apparatus as set forth in claim 1, wherein the cam angel signal, as outputted from the camshaft position sensor, switches between a high and a low level in synchronization with rotation of the camshaft, and further comprising a decision circuit working to make a decision of whether a change in level of the cam angle signal developed at a start of the engine is one which bears a given relation to the stop position estimate determined by said stop position estimating circuit or not, when the decision is positive, said crankshaft position determining circuit determining the position of the crankshaft at a start of the engine based on the stop position estimate, said engine controller performing the engine control task using the determined position of the crankshaft, when the decision is negative, said engine controller initiating the engine control task without use of the stop position estimate after the crankshaft position is determined by said crankshaft position determining circuit.

8. An engine control apparatus as set forth in claim 7, wherein said crankshaft position determining circuit is designed to determine the crankshaft position using both the crank angle signal and the cam angle signal.

9. An engine control apparatus as set forth in claim 7, further comprising a condition monitor circuit working to monitor whether a condition is encountered or not which causes the engine to undergo a given degree of resistance to rotation thereof, when the condition is determined to be encountered, said condition monitor circuit inhibiting said decision circuit from making the decision, and wherein when said condition monitor circuit inhibits said decision circuit from making the decision, said engine controller initiates the engine control task after the crankshaft position is determined by said crankshaft position determining circuit.

10. An engine control apparatus as set forth in claim 7, wherein the engine is installed in an automotive vehicle, further comprising a voltage monitor circuit which works to monitor whether a voltage developed by a storage battery installed in the vehicle is lower than a preselected level or not at a start of the engine, when the voltage is determined as be lower than the preselected level, said voltage monitor circuit inhibiting said decision circuit from making the decision, and wherein when said voltage monitor circuit inhibits said decision circuit from making the decision, said engine controller initiates the engine control task after the crankshaft position is determined by said crankshaft position determining circuit.

11. An engine control apparatus as set forth in claim 7, further comprising an error monitor circuit which works to monitor whether an error of input of the cam angle signal into the engine control apparatus has arisen or not at a start of the engine, when the error is detected, said error monitor circuit inhibiting said decision circuit from making the decision, and wherein when said error monitor circuit inhibits said decision circuit from making the decision, said engine controller initiates the engine control task after the crankshaft position is determined by said crankshaft position determining circuit.

12. An engine control apparatus as set forth in claim 7, wherein the cam angle signal changes in level a given number of times during a complete turn of the crankshaft.

13. An engine control apparatus as set forth in claim 12, wherein the crank angle signal consists of a combination of a train of pulses and a non-pulse portion, the combination being produced every turn of the crankshaft, the pulses having edges appearing in a unit of a preselected angle of rotation of the crankshaft, the non-pulse portion appearing when the crankshaft reaches a given reference position every turn of the crankshaft, wherein the cam angle signal having levels different between appearance of the non-pulse portion and following appearance of the non-pulse portion, and wherein said crankshaft position determining circuit works to monitor edge-to-edge intervals that are intervals each of which is developed between adjacent two of the pulses to find appearance of the non-pulse portion at the cam angle signal, when the appearance of the non-pulse portion is found, said crankshaft position determining circuit determining the crankshaft position based on the level of the cam angle signal upon the appearance of the non-pulse portion.

14. An engine control apparatus as set forth in claim 12, wherein the crank angle signal includes a train of pulses which have edges appearing in a unit of a preselected angle of rotation of the crankshaft, wherein the cam angle signal has changes in level in a given pattern in a cycle in which the camshaft makes a complete turn so that intervals between adjacent two of the changes in level are different from each other in terms of an angle of rotation of the crankshaft, and wherein said crankshaft position determining circuit works to determine the crankshaft position as a function of number of the edges of the pulses of the crank angle signal appearing within one of the intervals of the changes in level of the cam angle signal.

15. An engine control apparatus as set forth in claim 7, wherein the crankshaft position sensor is designed so that a predetermined level change appears when the crankshaft reaches a given reference position, wherein said crankshaft position determining circuit includes a first position determining circuit and a second position determining circuit, said first position determining circuit working to determine the position of the crankshaft using the stop position estimate and the cam angle signal at a start of the engine, further comprising a position updating circuit and a first failure detecting circuit, said position updating circuit working to update the position of the crankshaft based on the crank angle signal in synchronization of rotation of the engine once said first position determining circuit determines the position of the crankshaft, said first failure detecting circuit working to detect a failure in operation of said crankshaft position sensor, wherein when the position of the crankshaft is determined by said first position determining circuit at the start of the engine, said engine controller initiates the engine control task using the determined position of the crankshaft and then continues to execute the engine control task using the position of the crankshaft updated by said position updating circuit, wherein said second position determining circuit works to detect a fact that the crankshaft has reached the reference position using the crank angle signal to determine the position of the crankshaft at least when said first failure detecting circuit has detected the failure in operation of said crankshaft position sensor, and wherein when said camshaft position sensor has failed in operation, thereby resulting in a difficulty in determining the position of the crankshaft through said first position determining circuit, said engine controller initiates the engine control task using the position of the crankshaft as determined by said second position determining circuit.

16. An engine control apparatus as set forth in claim 15, wherein when detecting the fact that the crankshaft has reached the reference position using the crank angle signal, said second position determining circuit analyzes an instantaneous change in level of the crank angle signal to find the position of the crankshaft.

17. An engine control apparatus as set forth in claim 15, wherein said crankshaft position sensor includes an intake camshaft position sensor designed to measure an angular position of an intake camshaft of the engine to output an intake cam angle signal indicative thereof and an exhaust camshaft position sensor designed to measure an angular position of an exhaust camshaft of the engine to output an exhaust cam angle signal indicative thereof, wherein said first failure detecting circuit works to detect failures in operations of the intake and exhaust camshaft position sensors, respectively, wherein said first position determining circuit determines the position of the crankshaft based on the stop position estimate and the intake and exhaust cam angle signals, and wherein when said second position determining circuit detects the fact that the crankshaft has reached the reference position based on the crank angle signal, and said first failure detecting circuit has detected the failure in operation of one of the intake and exhaust camshaft position sensors, said second position determining circuit determines the position of the crankshaft based on one of the intake and exhaust cam angle signals outputted from the other of the intake and exhaust camshaft position sensors.

18. An engine control apparatus as set forth in claim 15, further comprising a second failure detecting circuit working to detect a failure in operation of the crankshaft position sensor and a third position determining circuit working to determine the position of the crankshaft in a cycle based on a change in level of the cam angle signal, and wherein when said second failure detecting circuit has detected the failure in operation of the crankshaft position sensor which results in a difficulty in updating the position of the crankshaft through said position updating circuit, said engine controller performs the engine control task using the position of the crankshaft determined cyclically by said third position determining circuit.

19. An engine control apparatus as set forth in claim 7, wherein said crankshaft position determining circuit includes a first position determining circuit and a second position determining circuit, said first position determining circuit working to determine the position of the crankshaft using the stop position estimate and the cam angle signal at a start of the engine, when the position of the crankshaft is determined by said first position determining circuit, the engine controller initiating the engine control task based on the determined position and then updating the determined position based on the crank angle signal in synchronization of rotation of the engine, wherein said second position determining circuit is designed to determine the position of the crankshaft in the operating cycle of the engine based on at least one of the crank angle signal and the cam angle signal, and wherein when said second position determining circuit has determined the position of the crankshaft before said first position determining the position of the crankshaft at the start of the engine, said engine controller initiates the engine control task based on the position of the crankshaft, as determined by said second position determining circuit.

20. An engine control apparatus as set forth in claim 19, wherein the crankshaft position sensor is designed so that a predetermined level change appears when the crankshaft reaches a given reference position, and wherein said second position determining circuit works to detect a fact that the crankshaft has reached the reference position using the crank angle signal to determine the position of the crankshaft, when detecting the fact, said second position determining circuit determining the position of the crankshaft based on one of an instantaneous value of the crank angel signal and a change in level of the cam angle signal.

21. An engine control apparatus as set forth in claim 20, further comprising a third position determining circuit working to determine the position of the crankshaft in a cycle based on a change in level of the cam angle signal, and wherein when the position of the crankshaft has been determined first among said first position determining circuit, said second position determining circuit, and said third position determining circuit, said engine controller launches the engine control task using the first determined position.

22. An engine control apparatus as set forth in claim 19, wherein said stop position estimating circuit works to monitor a change in level of one of the cam angle signal and the crank angle signal to determine whether the engine is running in a forward direction or a reverse direction, when a direction of rotation of the engine is found, said stop position estimating circuit determining the stop position estimate using the found direction, when a difficulty is encountered in finding the direction of rotation of the engine, said stop position estimating circuit determining stop position estimates of the crankshaft when the engine is viewed as running in the forward direction and when the engine is viewed as running in the reverse direction.

23. An engine control apparatus as set forth in claim 22, wherein said stop position estimating circuit includes a first direction determining feature working to find the direction of rotation of the engine using the change in level of the cam angle signal and a second direction determining feature working to find the direction of rotation of the engine using the change in level of the crank angle signal, and wherein when the direction of rotation of the engine is found by either of the first or second direction determining feature, said stop position estimating circuit determines the stop position estimate of the crankshaft based on the found direction, when a difficulty in finding the direction of rotation of the engine is encountered by both the first and second direction determining features, said stop position estimating circuit determining the stop position estimates of the crankshaft when the engine is viewed as running in the forward direction and when the engine is viewed as running in the reverse direction.

24. An engine control apparatus as set forth in claim 22, wherein when a plurality of the stop position estimates are produced by said stop position estimating circuit, said stop position estimating circuit works to determine whether the stop position estimates match reference values or not which are predetermined as being unsuitable for use in determining the position of the crankshaft in said first position determining circuit, and further comprising a stop position estimation inhibit circuit working to inhibit said stop position estimating circuit from estimating the position of the crankshaft expected to stop at the stop of the engine when the stop position estimates are determined as matching the reference values to inhibit said first position determining circuit from determining the position of the crankshaft at a subsequent start of the engine.

* * * * *